(12) United States Patent
Sugiura

(10) Patent No.: US 9,432,483 B2
(45) Date of Patent: Aug. 30, 2016

(54) SERVER DEVICE, CONTRIBUTION INFORMATION PROCESSING METHOD, CONTRIBUTION INFORMATION PROCESSING PROGRAM, AND RECORDING MEDIUM

(75) Inventor: Kenji Sugiura, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 619 days.

(21) Appl. No.: 13/811,125

(22) PCT Filed: Jul. 20, 2011

(86) PCT No.: PCT/JP2011/066464
§ 371 (c)(1),
(2), (4) Date: Jan. 18, 2013

(87) PCT Pub. No.: WO2012/011496
PCT Pub. Date: Jan. 26, 2012

(65) Prior Publication Data
US 2013/0117362 A1 May 9, 2013

(30) Foreign Application Priority Data

Jul. 21, 2010 (JP) ................................. 2010-164095
Jul. 21, 2010 (JP) ................................. 2010-164097

(51) Int. Cl.
*H04L 29/06* (2006.01)
*G06Q 10/10* (2012.01)

(52) U.S. Cl.
CPC .............. *H04L 67/42* (2013.01); *G06Q 10/10* (2013.01)

(58) Field of Classification Search
CPC .... G06Q 10/10; G06Q 20/145; G06Q 30/02; G06Q 40/08; G06Q 10/1053; G06Q 50/01; G06Q 40/00; G06Q 10/00; G06Q 30/0282; G06Q 10/06315; G06Q 30/00; G06Q 30/0242; G06Q 30/0603; G06Q 50/22; G06Q 10/02; G06Q 10/04; G06Q 10/06; G06Q 10/063114; G06Q 10/06312; G06Q 10/06393; G06Q 20/10; G06Q 20/105; G06Q 20/40; G06Q 30/018; G06Q 30/0203; G06Q 30/0211; G06Q 30/0205; G06Q 30/0631; G06Q 30/0257; G06Q 30/0269; G06Q 30/0202; G06Q 30/0256; G06Q 30/0261; G06Q 50/12; G06F 17/30817; G06F 17/30849; G06F 2221/0737; G06F 2221/0775; G06F 2221/2151; G06F 17/30864; G06F 17/3089; G06F 17/30061; G06F 17/3053; G06F 17/30699; G06F 17/30867; G06F 17/3097; H04L 51/12; H04L 51/32; H04L 69/329; H04L 67/02; H04L 67/1072
See application file for complete search history.

(56) References Cited

U.S. PATENT DOCUMENTS

| 6,819,919 B1* | 11/2004 | Tanaka ................... G06Q 10/10 342/357.31 |
| 8,682,880 B2* | 3/2014 | Fukui .................. G06F 17/3087 707/706 |
| 2009/0044623 A1* | 2/2009 | Matsumoto ........... G06F 17/276 73/488 |
| 2010/0070485 A1* | 3/2010 | Parsons ............. G06F 17/30864 707/709 |
| 2010/0088182 A1* | 4/2010 | Ryder .................. G06Q 10/107 705/14.66 |
| 2010/0312769 A1* | 12/2010 | Bailey ............... G06F 17/30705 707/740 |
| 2014/0089052 A1* | 3/2014 | Jones ................ G06F 17/30241 705/7.34 |

FOREIGN PATENT DOCUMENTS

| JP | 2006-134040 A | 5/2006 |
| JP | 2007-304977 A | 11/2007 |
| JP | 2008-242408 A | 10/2008 |
| JP | 2009-123192 A | 6/2009 |
| JP | 2009-289191 A | 12/2009 |
| JP | 2010-135925 A | 6/2010 |

OTHER PUBLICATIONS

Japanese Office Action dated Apr. 2, 2013 issued in Japanese Patent Application No. 2012-525412.
English Translation of Written Opinion of the International Searching Authority mailed Oct. 25, 2011 in International Patent Application No. PCT/JP2011/066464.
Hisako Asano,"Portal Service o Sasaeru Shizen Gengo Shori Gijutsu", NTT Gijutsu Journal, Jun. 1, 2008, pp. 12-15, vol. 20, No. 6.
"Dokusha no Nayami Sodanshitsu Q&A", YOMIURI PC, Oct. 1, 2008, pp. 80, vol. 13, No. 10.

\* cited by examiner

*Primary Examiner* — Kevin Bates
*Assistant Examiner* — Ranjan Pant
(74) *Attorney, Agent, or Firm* — Sughrue Mion, PLLC

(57) ABSTRACT

A server device to which a terminal device is connectable via a network includes contribution information acquisition code that causes at least one processor to acquire contribution information from the terminal device, terminal information acquisition code that causes at least one processor to acquire terminal position information indicating a position of the terminal device, extraction code that causes at least one processor to extract specific information capable of specifying a subject of contribution from the acquired contribution information, contribution subject information acquisition code that causes at least one processor to acquire contribution subject position information indicating a position of the subject of contribution, comparison code that causes at least one processor to compare the acquired contribution subject position information with the acquired terminal position information, and determination code that causes at least one processor to determine a display form of the contribution information on posting based on a comparison result.

8 Claims, 11 Drawing Sheets

FIG.6A
MEMBER INFORMATION DB

| USER ID |
| --- |
| PASSWORD |
| NAME |
| DATE OF BIRTH |
| SEX |
| ADDRESS |
| PHONE NUMBER |
| E-MAIL ADDRESS |
| . . . |

FIG.6B
CONTRIBUTION INFORMATION DB

| SERIAL NUMBER |
| --- |
| DATE AND TIME OF CONTRIBUTION |
| USER ID |
| CONTRIBUTION DATA |
| RELIABILITY |
| CONTRIBUTION THING WORD |
| POSITION INFORMATION OF USER TERMINAL |
| POSTING FLAG |

FIG.6C
POSITION INFORMATION DB (THING)

| THING WORD |
| --- |
| POSITION INFORMATION OF THING |
| STATE FLAG |
| SERIAL NUMBER OF CONTRIBUTION DATA |

FIG.6D
POSITION INFORMATION DB (IP ADDRESS)

| IP ADDRESS |
| --- |
| POSITION INFORMATION |

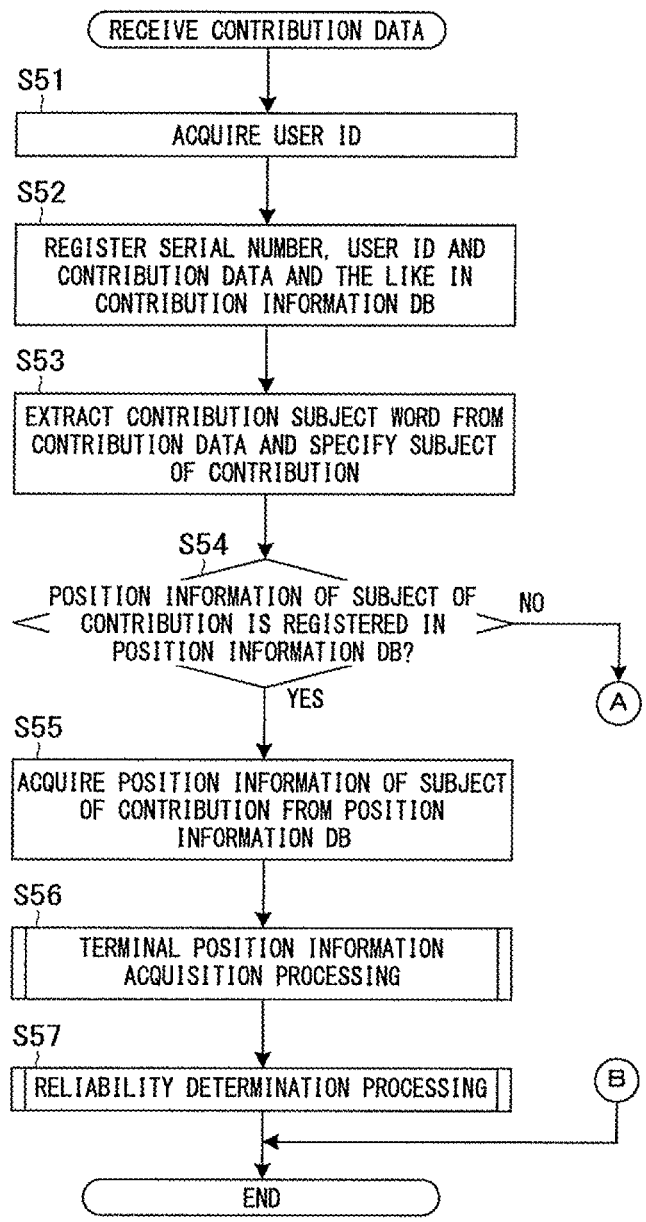

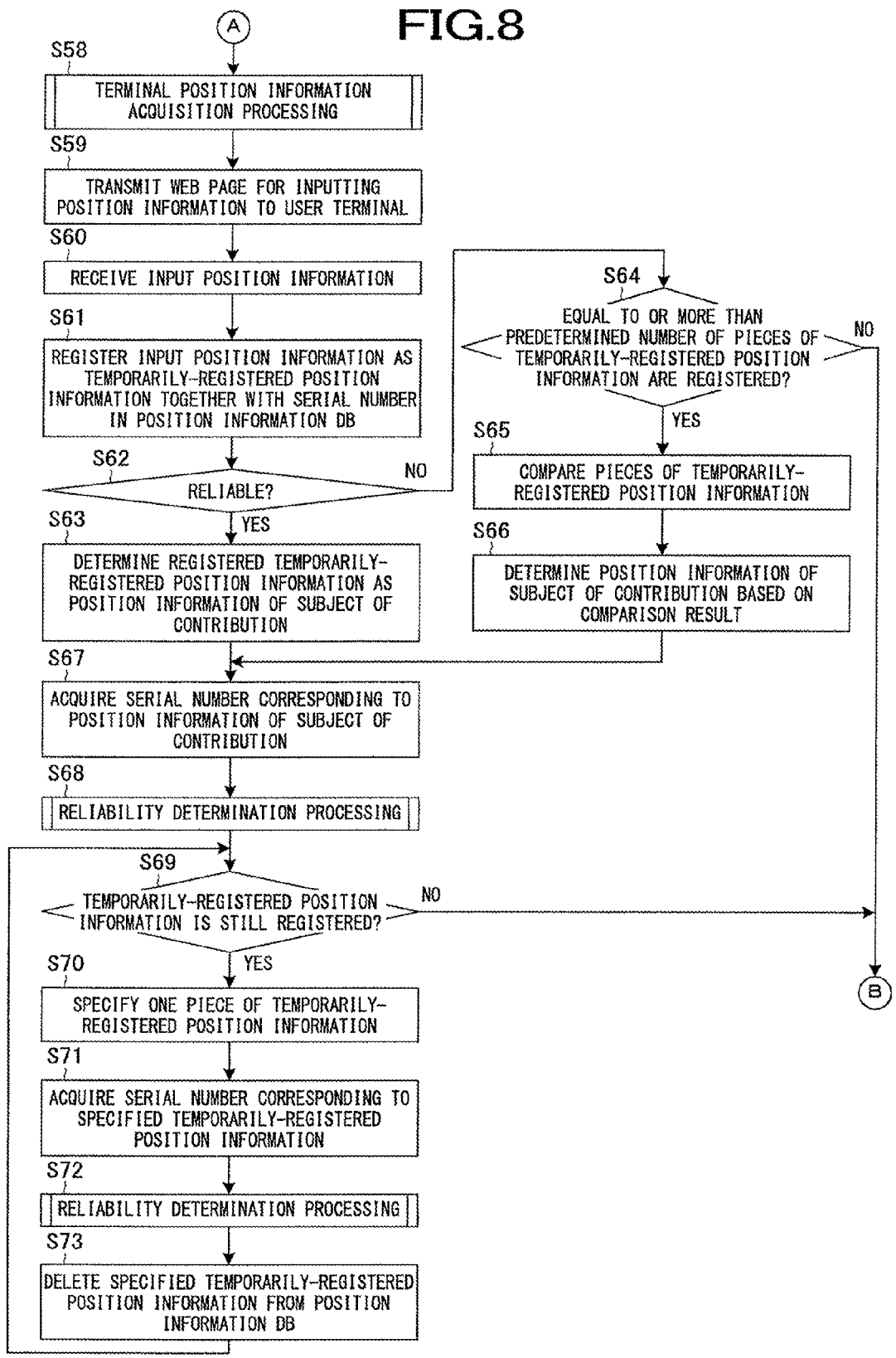

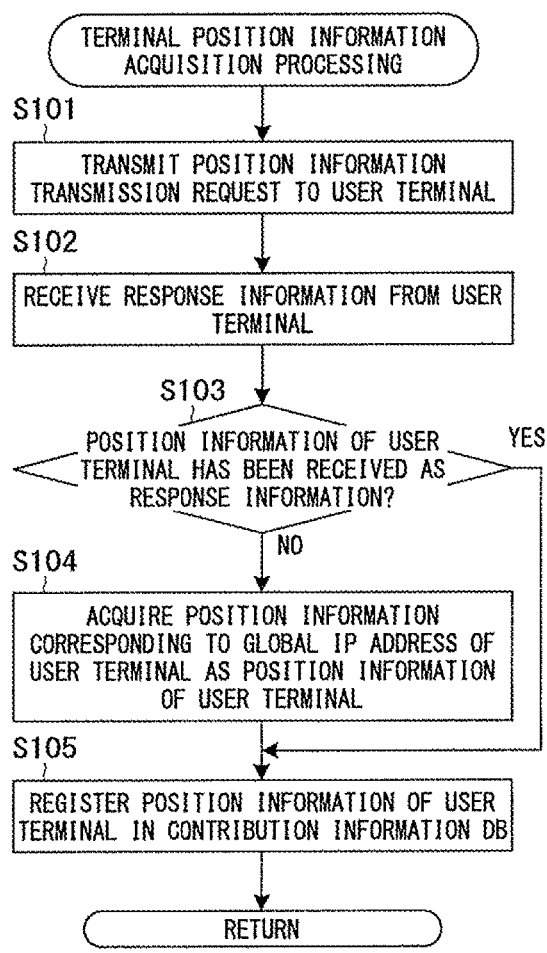

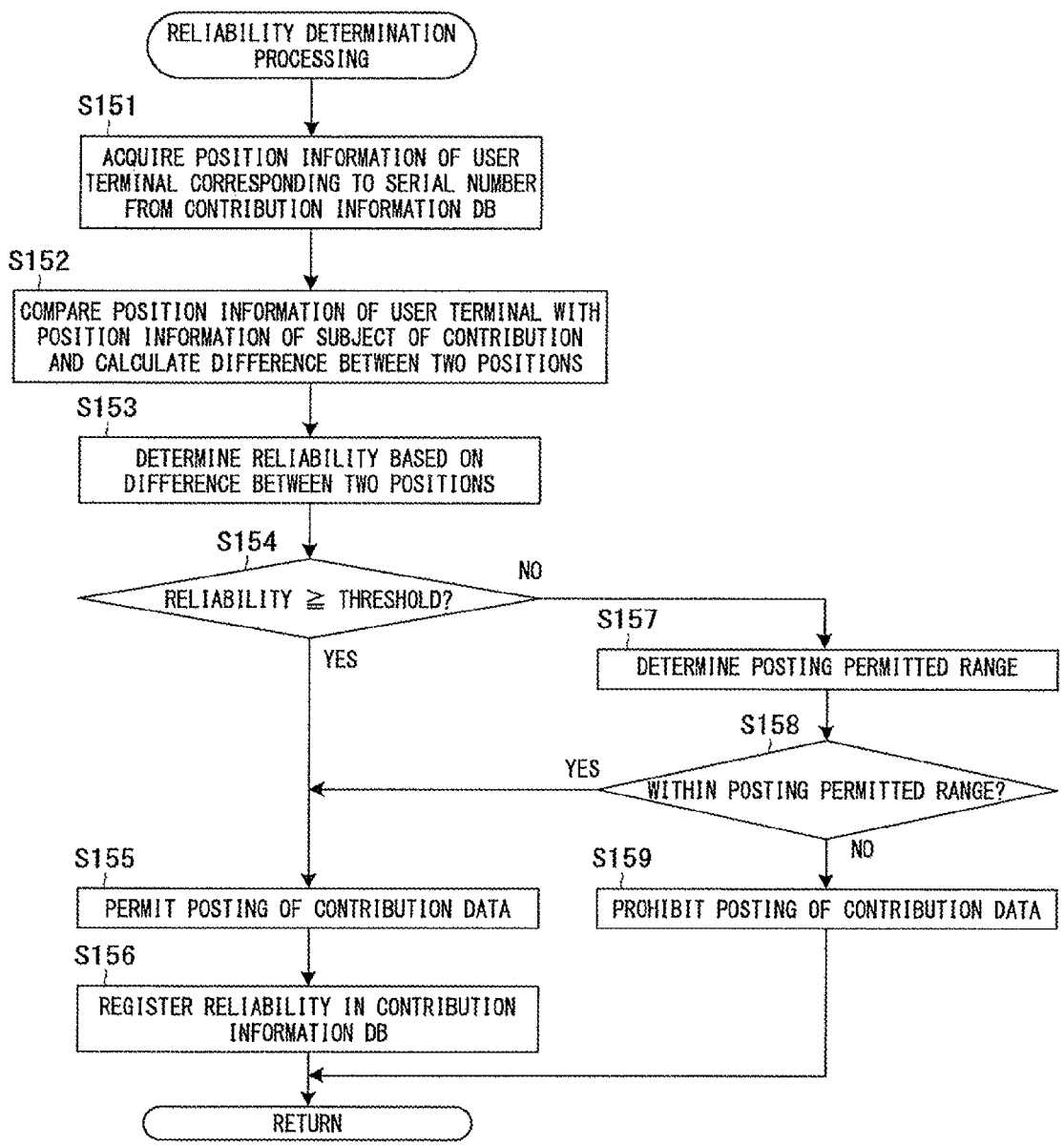

SERVER DEVICE, CONTRIBUTION INFORMATION PROCESSING METHOD, CONTRIBUTION INFORMATION PROCESSING PROGRAM, AND RECORDING MEDIUM

CROSS REFERENCE TO RELATED APPLICATIONS

This application is a National Stage of International Application No. PCT/JP2011/066464 filed Jul. 20, 2011, claiming priority based on Japanese Patent Application Nos. 2010-164095, filed Jul. 21, 2010 and 2010-164097, filed Jul. 21, 2010, the contents of all of which are incorporated herein by reference in their entirety.

TECHNICAL FIELD

The present invention relates to a technical field of a server device for performing a processing of posting information contributed by a user, contribution information processing method, a contribution information processing program, and a recording medium.

BACKGROUND ART

In recent years, there have been paid attention contribution sites established by users' contributions such as blogs, mini-blogs and word-of-mouth sites over Internet. In such a contribution site, users' contribution information is posted on Web pages such that other persons can browse the information. The user can freely originate information by use of the mechanism. However, information unsuitable for being posted is present in the contribution information. There has been conventionally proposed a technique for preventing improper information from being posted.

For example, Patent Document 1 describes therein a technique for determining whether to post contribution information based on a judge's determination result as to whether to permit or prohibit the posting, and for determining whether to keep posting the contribution information based on a determination result indicating posting prohibition by a viewer who views the posting-permitted contribution information.

CITATION LIST

Patent Document

Patent Document 1: Japanese Patent Application Laid-Open No. 2006-134040

SUMMARY OF THE INVENTION

Problem to be Solved by the Invention

A user of a contribution site may determine a thing present or what happened at a place as a subject of contribution and contribute. It is considered that a difference in reliability is present among the contributed information depending on when a user directly experiences the subject of contribution or when he/she does not experience the subject. That is, it is considered that when the user directly experiences the subject of contribution, he/she obtained direct information on the subject of contribution. On the other hand, it is considered that when the user does not directly experience the subject of contribution, he/she made a contribution based on indirect information on the subject of contribution. Thus, the information in the latter case tends to have a less reliability.

Since users' information from users is published on the contribution site, it is not proper that all the contributed information is uniformly posted irrespective of their reliabilities in consideration of an effect on the subject of contribution by the posted information.

However, in the technique described in Patent Document 1, a person looks at contributed information and determines whether to permit or prohibit posting, and thus a reliability of the contribution information cannot be effectively judged. This is because judgment on the reliability for the contribution information changes per person who views the contribution information.

If the reliability is difficult to judge by a viewer based on the content of the posted contribution information, a more effective method for judging reliability is required. In consideration of an effect of the contribution information on the viewers, it is preferable that contribution information with a high reliability is posted to be more easily understood than contribution information with a low reliability.

Therefore, the present invention has been made in view of the above problems, and it is an object thereof to provide a server device capable of posting contribution information such that viewers can recognize a reliability of the contribution information, a contribution information processing method, a contribution information processing program, and a recording medium.

Means for Solving the Problem

In order to achieve the above object, the invention according to claim 1 relates to a server device to which a terminal device is connectable via a network, comprising: a contribution information acquisition means that acquires contribution information from the terminal device; a terminal information acquisition means that acquires terminal position information indicating a position of the terminal device; an extraction means that extracts specific information capable of specifying a subject of contribution from the acquired contribution information; a contribution subject information acquisition means that acquires contribution subject position information indicating a position of the subject of contribution specified by the extracted specific information; a comparison means that compares the acquired contribution subject position information with the acquired terminal position information; and a determination means that determines a display form of the acquired contribution information on posting based on a comparison result by the comparison means.

According to the invention, the position where the subject of contribution specified based on the contribution information was present or happened is compared with the position of the terminal device from which the contribution information is obtained, and a display form of the contribution information on posting is determined based on the comparison result. Thus, the display form of the contribution information to be posted can be determined depending on whether the user can directly experience the subject of contribution based on the position relationship between the subject of contribution and the terminal device. Thus, the viewer can recognize the reliability of the contributed information based on the display form of the contribution information.

The invention according to claim 2 relates to the server device according to claim 1, wherein the determination means determines whether to permit or prohibit the posting of the acquired contribution information based on a comparison result by the comparison means.

According to the invention, the position where the subject of contribution specified based on the contribution information was present or happened is compared with the position of the terminal device from which the contribution information is obtained, and a determination is made as to whether to permit or prohibit the posting of the contribution information based on the comparison result. Thus, a judgment is made as to whether the user can directly experience the subject of contribution based on the position relationship between the subject of contribution and the terminal device, and thereby it is possible to determine whether to permit or prohibit the posting. Thus, it is possible to prevent information with a low reliability, which was contributed without user's direct experience, from being posted.

The invention according to claim 3 relates to the server device according to claim 1 or 2, further comprising: a judgment means that determines whether the contribution subject position information corresponding to the extracted specific information is stored in a storage means that stores the contribution subject position information in association with the specific information; an input information acquisition means that acquires input position information input by a user from the terminal device when it is determined that the contribution subject position information corresponding to the extracted specific information is not stored; and a position information storage control means that stores the acquired input position information as the contribution subject position information in the storage means in association with the extracted specific information, wherein the contribution subject information acquisition means acquires the contribution subject position information stored in the storage means as the contribution subject position information used for a comparison by the comparison means.

According to the invention, when the position information of the subject of contribution which should be used for determining the display form of the contribution information is not stored, the user-input position information is stored as the position information of the contribution information, and is used for determining the display form of the contribution information. Thus, even when an event which cannot be previously known when and where to happen, such as incident or accident, is determined as a subject of contribution and the contribution is performed, the display form of the contribution information can be determined.

The invention according to claim 4 relates to the server device according to claim 3, in which the judgment means determines whether equal to or more than a predetermined number of pieces of the contribution subject position information corresponding to the extracted specific information are stored in the storage means, further comprising: a contribution subject position information comparison means that, when it is determined that equal to or more than a predetermined number of pieces of the contribution subject position information corresponding to the extracted specific information are stored, compares the pieces of contribution subject position information; and a contribution subject position information determination means that determines the contribution subject position information used for a comparison by the comparison means based on a comparison result by the contribution subject position information comparison means, wherein the contribution subject information acquisition means acquires the contribution subject position information determined by the contribution subject position information determination means.

According to the invention, when equal to or more than a predetermined number of pieces of user-input position information are stored, the pieces of input position information are compared with each other, and the position information of the subject of contribution used for determining the display form of the contribution information is determined based on the comparison result. Therefore, multiple pieces of position information are used to determine the position information of the subject of contribution, and thereby it is possible to enhance the reliability of the position information of the subject of contribution.

The invention according to claim 5 relates to the server device according to any one of claims 1 to 4, further comprising: a word extraction means that extracts at least one of a negative word and a positive word from the contribution information, wherein the determination means determines a display form of the acquired contribution information on posting based on a comparison result by the comparison means and an extraction result by the word extraction means.

According to the invention, in consideration of an effect on the subject of contribution when the contribution information is posted, the display form of the contribution information on posting can be determined.

The invention according to claim 6 relates to the server device according to any one of claims 1 to 5, further comprising: an identification information acquisition means that acquires identification information for identifying a user of the terminal device; and a contribution information storage control means that stores the acquired contribution information, result information indicating a comparison result by the comparison means, and the acquired identification information in a contribution information storage means in an associated manner, wherein the determination means determines a display form of the acquired contribution information on posting based on a comparison result by the comparison means and the result information stored in the past in association with the acquired identification information.

According to the invention, in consideration of the comparison result of the pieces of position information on the past contributions by the user, the display form of the contribution information is determined. Thus, the reliability of the contribution data past-contributed by the user can be reflected on the display form of the contribution information.

The invention according to claim 7 relates to the server device according to any one of claims 1 to 6, wherein the contribution subject information acquisition means acquires the contribution subject position information per one piece of the specific information when the plurality of pieces of specific information are extracted, the comparison means compares the contribution subject position information acquired per one piece of the specific information with the acquired terminal position information, and the determination means determines a display form of the acquired contribution information on posting based on a comparison result between the contribution subject position information indicating a position closest to the position indicated by the acquired terminal position information among the contribution subject position information acquired per one piece of the specific information, and the terminal position information.

According to the invention, when multiple subjects of contribution are specified, a position of the subject of contribution closest to the position of the terminal device is used for determining the display form. Therefore, even when the user contributes multiple things, the display form can be properly determined.

The invention according to claim 8 relates to the server device according to claim 2, further comprising: a word extraction means that extracts at least one of a negative word and a positive word from the contribution information; and a range determination means that determines a position range in which the contribution information is permitted to post based on an extraction result by the word extraction means, wherein when a position indicated by the acquired terminal position information is included in the determined range from a position indicated by the acquired contribution subject position information, the determination means determines to permit the posting.

According to the invention, in consideration of an effect on the subject of contribution when the contribution information is posted, a user's position range in which contribution is permitted can be determined.

The invention according to claim 9 relates to the server device according to claim 2 or 8, further comprising: an identification information acquisition means that acquires identification information for identifying a user of the terminal device; a contribution information storage control means that stores the acquired contribution information in a contribution information storage means in association with the acquired identification information; a frequency information acquisition means that acquires frequency information indicating the number of permissions by the determination means for posting the contribution information corresponding to the acquired identification information; and a range determination means that determines a position range in which the contribution information is permitted to post based on the acquired frequency information and enlarges the range as the number indicated by the frequency information is larger, wherein when a position indicated by the acquired terminal position information is included in the determined range from a position indicated by the acquired contribution subject position information, the determination means determines to permit the posting.

According to the invention, as the number of permissions to post the user's past contribution is more, the posting is permitted even when the user contributes at a farther location from the subject of contribution. Therefore, it is possible to post the information from a user who is considered as highly reliable based on the past records.

The invention according to claim 10 relates to a contribution information processing method in a server device to which a terminal device is connectable via a network, the method comprising: a contribution information acquisition step of acquiring contribution information from the terminal device; a terminal information acquisition step of acquiring terminal position information indicating a position of the terminal device; an extraction step of extracting specific information capable of specifying a subject of contribution from the acquired contribution information; a contribution subject information acquisition step of acquiring contribution subject position information indicating a position of the subject of contribution specified by the extracted specific information; a comparison step of comparing the acquired contribution subject position information with the acquired terminal position information; and a determination step of determining a display form of the acquired contribution information on posting based on a comparison result in the comparison step.

The invention according to claim 11 relates to a contribution information processing program for causing a computer included in a server device to which a terminal device is connectable via a network to function as: a contribution information acquisition means that acquires contribution information from the terminal device; a terminal information acquisition means that acquires terminal position information indicating a position of the terminal device; an extraction means that extracts specific information capable of specifying a subject of contribution from the acquired contribution information; a contribution subject information acquisition means that acquires contribution subject position information indicating a position of the subject of contribution specified by the extracted specific information; a comparison means that compares the acquired contribution subject position information with the acquired terminal position information; and a determination means that determines a display form of the acquired contribution information on posting based on a comparison result by the comparison means.

The invention according to claim 12 relates to a recording medium computer-readably recording a contribution information processing program therein, the program causing a computer included in a server device to which a terminal device is connectable via a network to function as: a contribution information acquisition means that acquires contribution information from the terminal device; a terminal information acquisition means that acquires terminal position information indicating a position of the terminal device; an extraction means that extracts specific information capable of specifying a subject of contribution from the acquired contribution information; a contribution subject information acquisition means that acquires contribution subject position information indicating a position of the subject of contribution specified by the extracted specific information; a comparison means that compares the acquired contribution subject position information with the acquired terminal position information; and a determination means that determines a display form of the acquired contribution information on posting based on a comparison result by the comparison means.

Effect of the Invention

According to the present invention, the position where the subject of contribution specified based on the contribution information was present or happened is compared with the position of the terminal device from which the contribution information is obtained, and a display form of the contribution information on posting is determined based on the comparison result. Thus, the display form of the contribution information to be posted can be determined depending on whether the user can directly experience the subject of contribution based on the position relationship between the subject of contribution and the terminal device. Thus, the viewer can recognize the reliability of the contributed information based on the display form of the contribution information.

BRIEF DESCRIPTION OF THE DRAWINGS

FIG. 6(a) is a diagram showing an example of contents registered in a member information DB 12a.

FIG. 6(b) is a diagram showing an example of contents registered in a contribution information DB 12b.

FIG. 6(c) is a diagram showing an example of contents registered in a position information DB 12c.

FIG. 6(d) is a diagram showing an example of contents registered in the position information DB 12c.

FIG. 7 is a flowchart showing a processing example in a contribution data reception process by a system control unit 14 in the contribution information management server 1 according to one embodiment.

FIG. 8 is a flowchart showing a processing example in the contribution data reception process by the system control unit 14 in the contribution information management server 1 according to one embodiment.

FIG. 9 is a flowchart showing a processing example in a terminal information acquisition process by the system control unit 14 in the contribution information management server 1 according to one embodiment.

FIG. 10 is a flowchart showing a processing example in a reliability degree determination process by the system control unit 14 in the contribution information management server 1 according to one embodiment.

MODES FOR CARRYING OUT THE INVENTION

Hereinafter, an embodiment according to the present invention will be described below in detail with reference to the drawings. The embodiment described later is when the present invention is applied to a contribution system.

[1. Outline of Structure and Functions of Contribution System]

First, a structure and schematic functions of a contribution system S according to the present embodiment will be described with reference to FIGS. 1 to 4.

Figure 1:
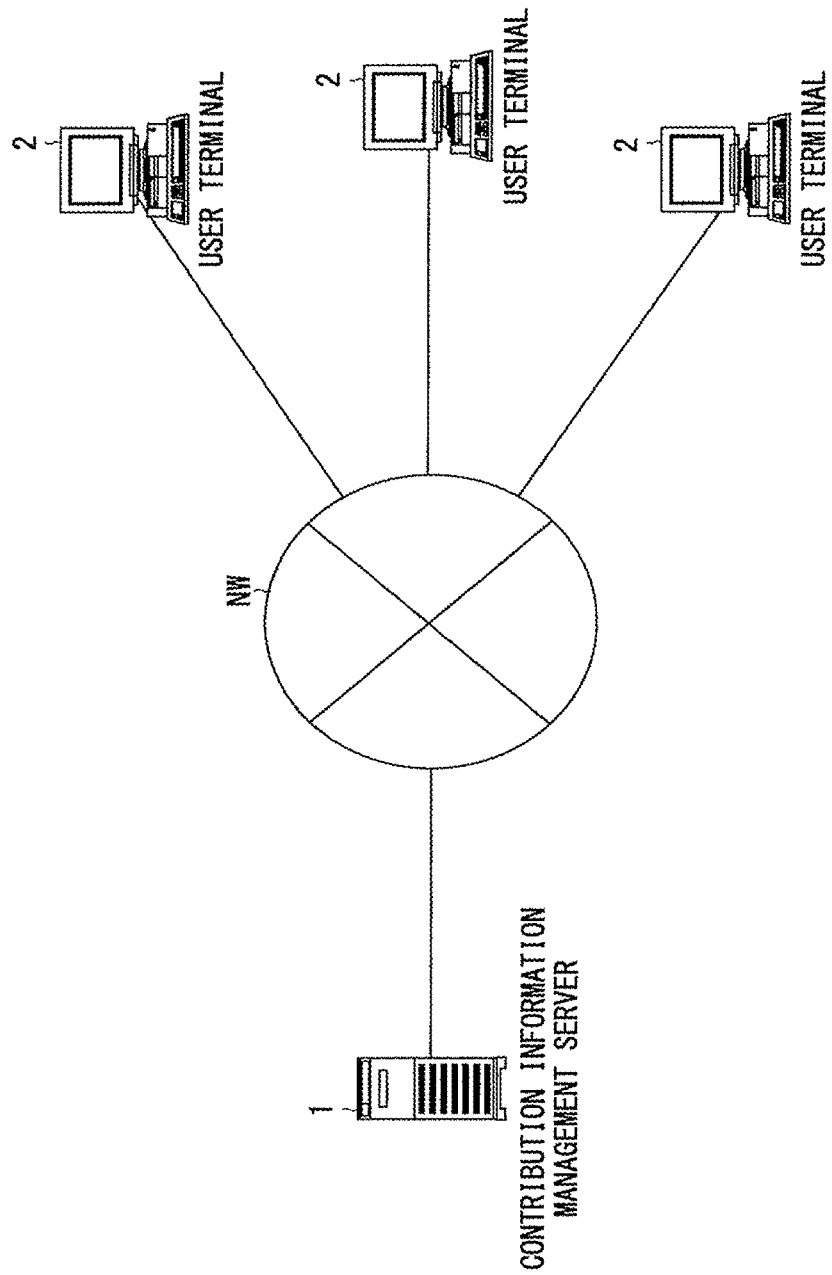
FIG. 1 is a diagram showing an example of the schematic structure of a contribution system S according to one embodiment.

FIG. 1 is a diagram showing an example of the schematic structure of the contribution system S according to the present embodiment.

As shown in FIG. 1, the contribution system S includes a contribution information management server 1 as an example of the server device, and multiple user terminals 2 as examples of the terminal devices. Then, the contribution information management server 1 and each user terminal 2 can mutually send and receive data with each other by use of a communication protocol such as TCP/IP via a network NW. Incidentally, the network NW is constructed of Internet, a dedicated communication line (such as CATV (Community Antenna Television) line), a mobile communication network (including base stations and the like), and a gateway, for example.

The contribution information management server 1 is a Web server for receiving contribution information contributed by the users and configuring contribution site where the contribution information is posted on Web pages. The contribution site is a blog, a mini-blog, a SNS (Social Network Service), a word-of-mouth site, a bulletin board, a news site made of users-contributed news or the like, for example.

The user terminal 2 is a terminal device which is used by the user for contributing information to the contribution site and browsing the contributed information. In the user terminal 2, a browser for browsing Web pages is incorporated. The user terminal 2 employs a personal computer, a PDA (Personal Digital Assistant), a portable information terminal such as smartphone, or a cell phone, for example.

The contribution information contributed on the contribution sites is information contributed for a thing as subject matter or topic. The thing to be the subject of contribution is an object present at a place (including natural object such as mountain, building or shop), or an event happening at a place (such as incident, accident, or festival), for example. If the user contributes a thing present or happening at a place without experience or direct seeing and hearing, a reliability of the contribution information is considered low. The user can contribute a false content by which the user seems to have experienced or seen and heard, although he/she was not actually present at the place.

The contribution information management server 1 controls a form of output (an example of the display form) of contribution information depending on the reliability of the contribution information when posting the contribution information on a Web page.

Specifically, when acquiring the contribution information from the user terminal 2, the contribution information management server 1 compares a position of the user who had contributed (which will be called "contribution position" below) with the position where the subject of contribution was present or happened (which will be called "position of the subject of contribution" below), and calculates a coincidence between the two positions. Then, the contribution information management server 1 determines that the reliability of the contribution information is higher as the contribution position is closer to the position of the subject of contribution. This is because the user is more likely to have experienced or directly seen and heard the subject of contribution as the contribution position is closer to the position of the subject of contribution. The contribution information management server 1 determines, as the form of output, a display form of the contribution information depending on the reliability of the contribution information.

In Addition, the contribution information management server 1 determines, as the form of output, to permit or prohibit the posting of the contribution information with a low reliability instead of posting all the users' contribution information on a Web page.

Figure 2:
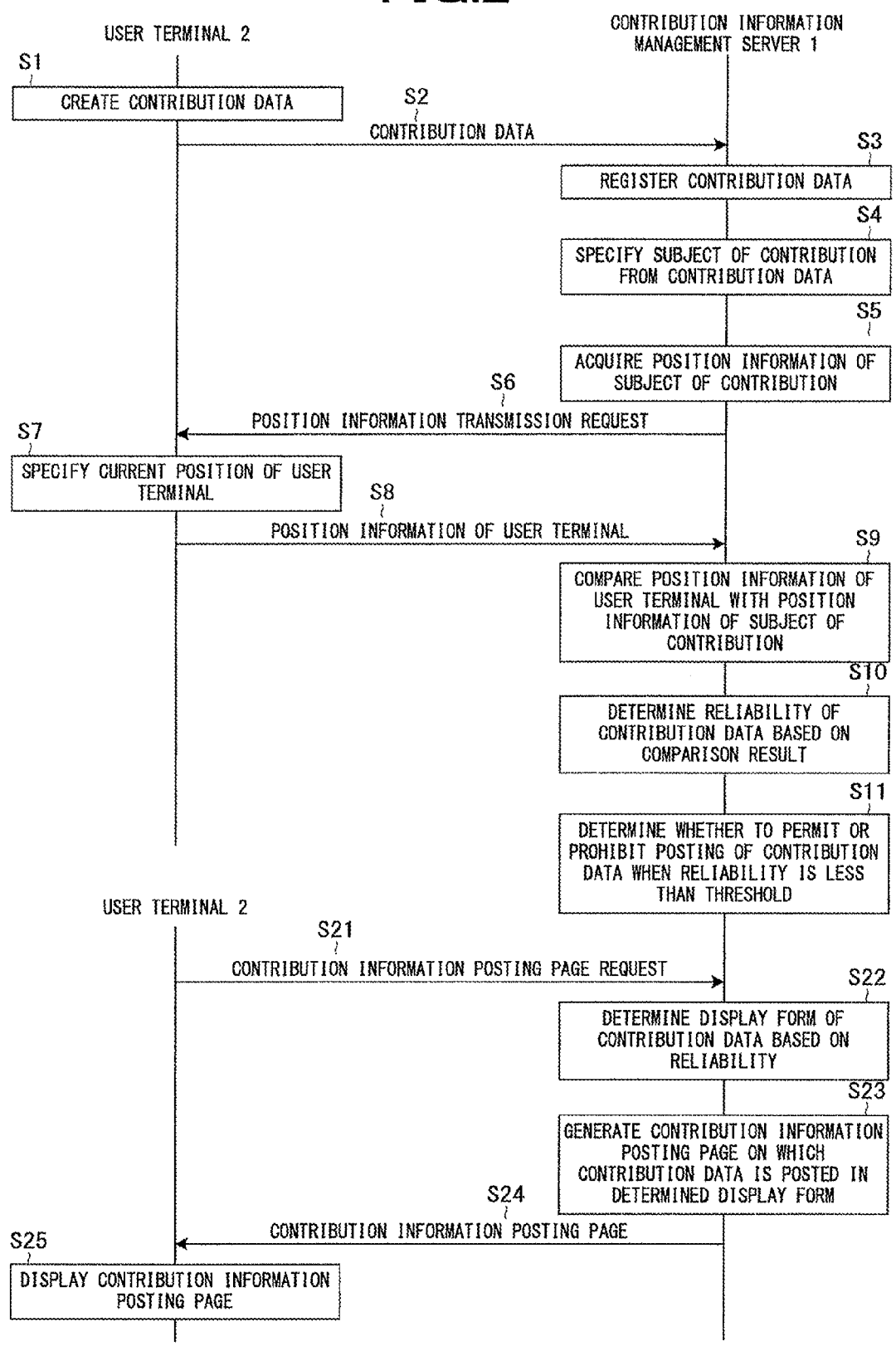
FIG. 2 is a sequence diagram showing an example of a flow of a basic processing in the contribution system S according to one embodiment.

FIG. 2 is a sequence diagram showing an example of a flow of a basic processing in the contribution system S according to the present embodiment.

As shown in FIG. 2, when the user operates the user terminal 2 to input a text and creates text data as contribution information (which will be called "contribution data" below) (step S1), the user terminal 2 transmits the contribution data to the contribution information management server 1 (step S2).

The contribution information management server 1 registers the received contribution data in a contribution information DB (database) 12b described later (step S3). Next, the contribution information management server 1 extracts a word indicating the subject of contribution (which will be called "contribution subject word" below) from the contribution data, and specifies the subject of contribution (step S4). Next, the contribution information management server 1 acquires position information indicating the position of the subject of contribution as correct answer data from a position information DB 12*c* described later (step S5). Next, the contribution information management server 1 transmits a position information transmission request to the user terminal 2 in order to acquire the position information indicating the contribution position (step S6).

The user terminal 2 having received the position information transmission request specifies a current position of the user terminal 2 as the contribution position (step S7). For example, if the user terminal 2 has a GPS (Global positioning System) position measuring function, the user terminal 2 can measure a current position. For example, if the user terminal 2 is a cell phone, the user terminal 2 can specify a current position in units of area (cell) in which each wireless base station can make communication with the cell phone.

The user terminal 2 transmits the position information indicating the specified current position (which will be called "position information of the user terminal 2" below) to the contribution information management server 1 (step S8). Incidentally, if the user terminal 2 cannot specify the position of the user terminal 2, the contribution information management server 1 specifies the position of the user terminal 2. For example, the position of the user terminal 2 can be specified based on a global IP address of the user terminal 2. The IP address is assigned to each organization such as ISP (Internet Service Provider), agency or company. If the organization owns a network over multiple areas, each organization assigns the assigned IP address to a network in each area. Thus, the current position of the user terminal 2 can be specified in units of district such as municipality.

When acquiring the position information of the user terminal 2 (an example of the terminal position information), the contribution information management server 1 compares the position information of the user terminal 2 with the position information of the subject of contribution as correct answer data (an example of the contribution subject position information) (step S9), and determines a reliability degree of the contribution data (an example of the result information) based on the comparison result (step S10). The reliability degree is a number indicating a degree of reliability of contribution data. A higher reliability degree indicates a higher reliability of contribution data. The contribution information management server 1 makes the reliability degree higher as the contribution position is closer to the subject of contribution.

The contribution information management server 1 permits the contribution information to be posted when the reliability degree is a preset threshold or more. On the other hand, when the reliability degree is less than the threshold, the contribution information management server 1 determines to permit or prohibit the posting of the contribution data (step S11). The factors for determining whether to permit or prohibit the posting of the contribution data include a reliability degree of the user who has contributed, for example, in addition to the comparison result of the position information. For example, when the reliability degree of the contribution data is low and the reliability degree of the user is also low, the posting of the contribution data is prohibited. When determining to prohibit the posting, the contribution information management server 1 deletes the contribution data from the contribution information DB 12*b*, for example.

Thereafter, for example, another user terminal 2 transmits a request for a Web page on which the contribution data is posted (which will be called "contribution information posting page" below) to the contribution information management server 1 (step S21).

The contribution information management server 1 having received the request determines a display form of the contribution data to be posted on the contribution information posting page based on its reliability degree (step S22). Specifically, the contribution information management server 1 determines a display form by which the user can easily read the contribution data as the reliability degree is higher. A default display form of the contribution data is preset. Therefore, the contribution information management server 1 determines a display form which is more conspicuous than the default display form as the reliability degree is higher. Then, the contribution information management server 1 generates a contribution information posting page on which the contribution data is displayed in the determined display form (step S23), and transmits the generated contribution information posting page to the user terminal 2 (step S24).

The user terminal 2 displays the received contribution information posting page on the screen (step S25).

Figure 3:
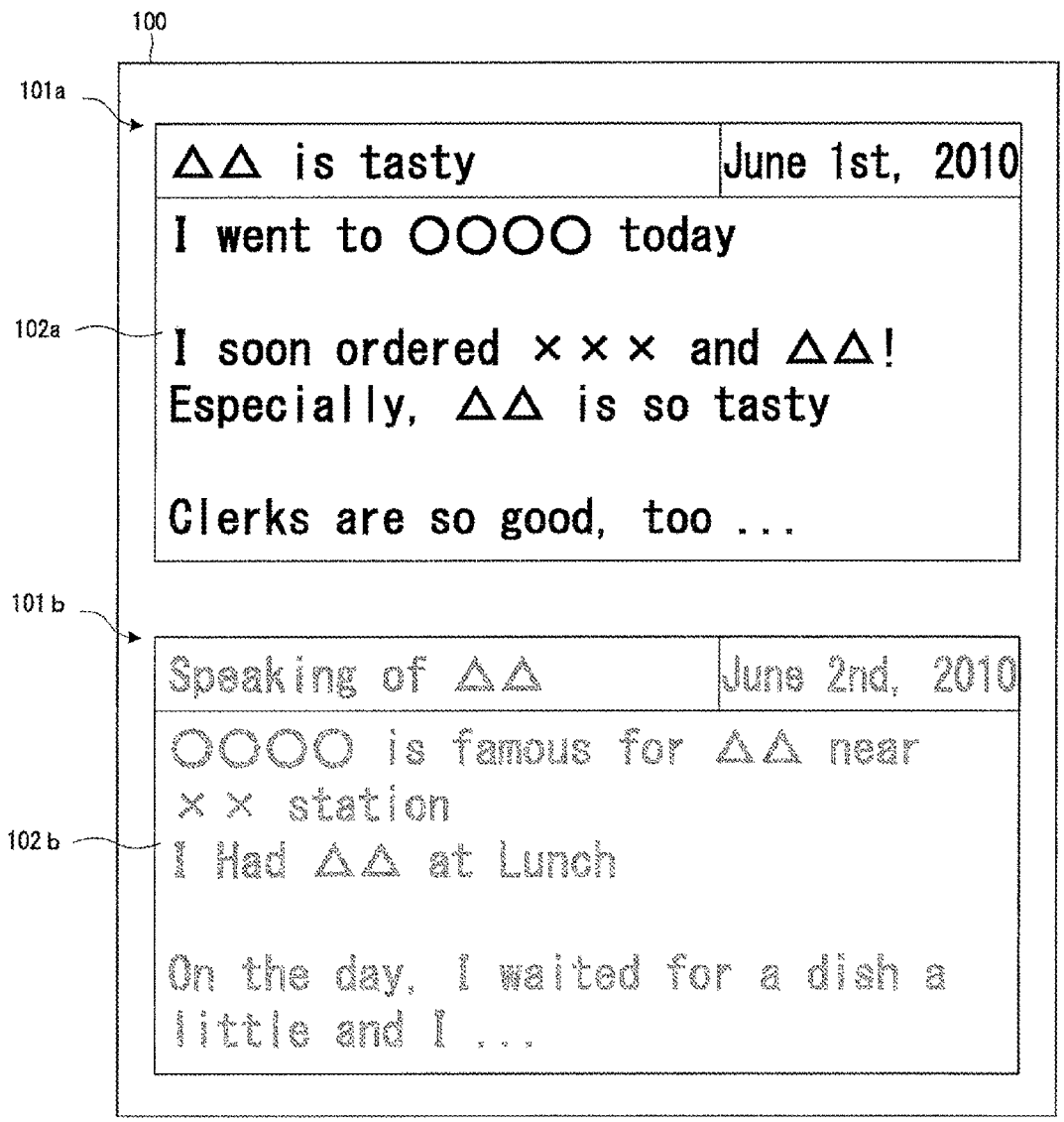
FIG. 3 is a screen display example of a contribution information posting page.
Figure 4:
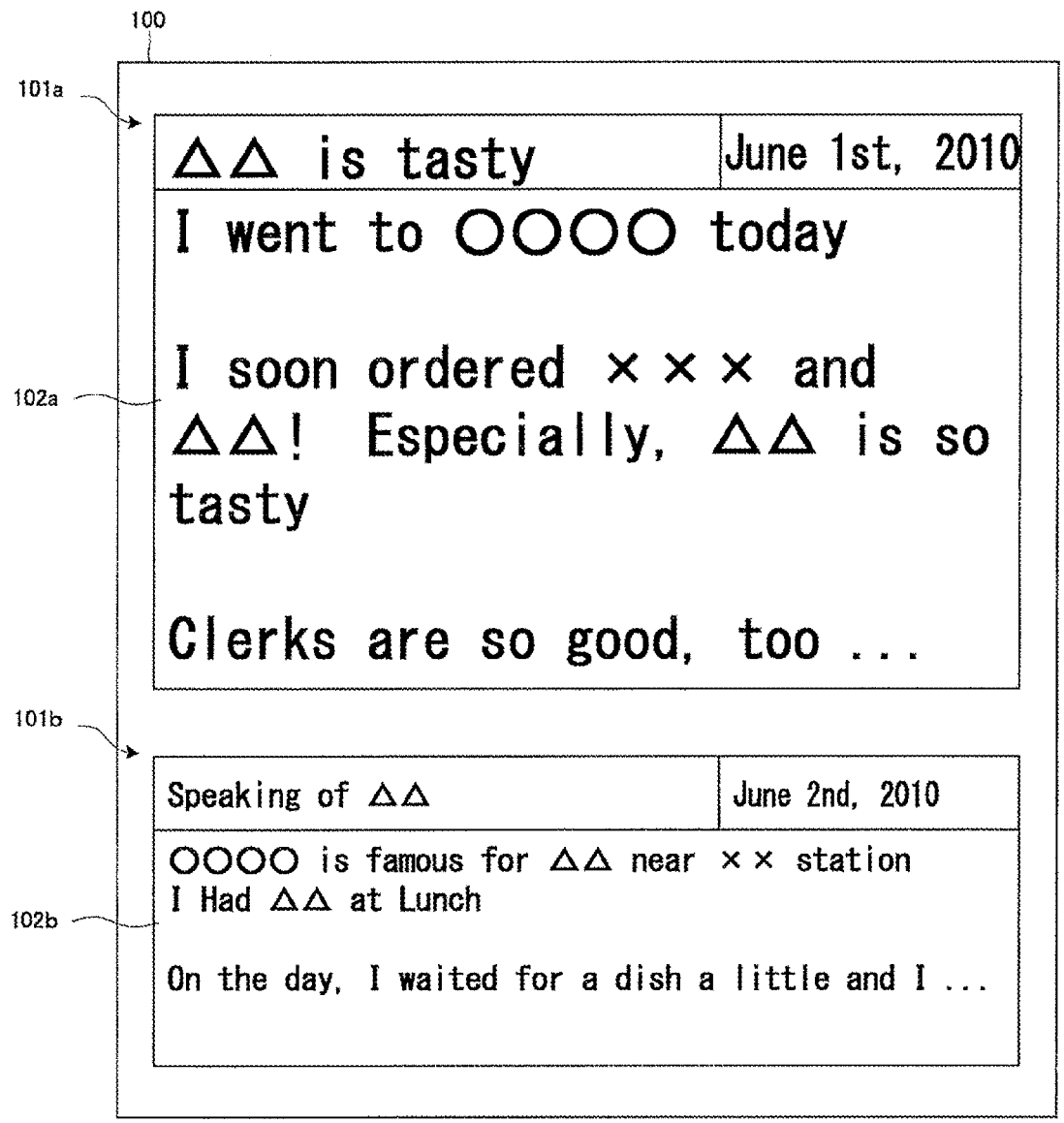
FIG. 4 is a screen display example of a contribution information posting page.

FIGS. 3 and 4 are examples of the screen displays of the contribution information posting page. In FIGS. 3 and 4, numeral 100 indicates a contribution information posting page. The contribution information posting page 100 includes contribution data display columns 101*a*, 101*b* and the like, for example. In the contribution data display column 101*a*, contribution data 102*a* is displayed, and in the contribution data display column 101*b*, contribution data 102*b* is displayed. The pieces of contribution data 102*a* and 102*b* include a title and a sentence as contribution content.

FIG. 3 shows a display example when a text color of the contribution data is changed depending on the reliability degree. In this case, for example, as the reliability degree is higher, the text color of the contribution data is farther from the background color of the contribution data display column, and as the reliability degree is lower, the text color of the contribution data is closer to the background color of the contribution data display column. That the color is farther or closer means a visual distance of the color, for example, that is, as the distance of the color is farther, the text is easy to distinguish from the background, and as the distance of the color is closer, the text is difficult to distinguish from the background. The distance of the color is determined based on a difference in color or a difference in luminance, for example. Actually, the color of the default of the text is preset. Therefore, as the reliability degree is higher, the text color of the contribution data is easier to distinguish from the background than from the color of the default.

For example, when the background of the contribution data display columns 101*a* and 101*b* is white, as the reliability degree is higher, the luminance of the text color of the contribution data is lowered. For example, since the reliability degree of the contribution data 102*a* is higher than the reliability degree of the contribution data 102*b*, the text color of the contribution data 102*a* is farther (for example, black) from white as compared with the text color of the contribution data 102*b*. On the other hand, the text color of the contribution data 102*b* is closer (for example, light gray) to white as compared with the text color of the contribution data 102*a*.

The transparency of the text of the contribution data may be changed depending on the reliability degree. In this case, for example, as the reliability degree is higher, the transparency of the text of the contribution data is lowered, and as the reliability degree is lower, the transparency of the text of the contribution data is enhanced. This case is also based on the same concept as the example in FIG. 3. When the background of the contribution data display column is a pattern, as the transparency of the text of the contribution data is higher, the pattern on the background of the text is more viewable.

FIG. 4 shows a display example when a font size of the text of the contribution data is changed depending on the reliability degree. In this case, for example, as the reliability degree is higher, the font size of the text of the contribution data is increased, and as the reliability degree is lower, the font size of the text of the contribution data is reduced. Actually, the font size of the default is preset. Therefore, as the reliability degree is higher, the font size of the contribution data is made larger than that of the default. For example, since the reliability degree of the contribution data 102*a* is higher than the reliability degree of the contribution data 102*b*, the font size of the text of the contribution data 102*a* is larger than the font size of the text of the contribution data 102*b*. That is, the font size of the text of the contribution data 102*b* is closer to the font size of the default than the font size of the text of the contribution data 102*a*.

For example, a thickness or font style of characters in the text of the contribution data may be changed depending on the reliability degree.

The user having browsed the contribution information posting page can recognize the reliability degree of the contribution data depending on the display form of the contribution data. The user totally judges the contents of the contribution data and the reliability degree of the contribution data, for example, and thereby it is possible to determine whether the contribution data is reliable.

Incidentally, as the reliability degree is higher, there may not be taken the display form in which the user can easily read the contribution data. It is allowable that the display form of the contribution data is a display form by which the user can roughly recognize the reliability degree of the contribution data.

As the reliability degree is lower, the display form of the contribution data may be less conspicuous than the display form of the default. The contribution information management server 1 may have the display form of the contribution data in which the information indicating the reliability degree is displayed in association with the contribution data. For example, when the reliability degree is the predetermined value or more, the information of "this information has a high reliability degree" may be displayed near the contribution data display column. For example, the contribution data display column is provided with a column for displaying information indicating the reliability degree. In this column, a figure or the like indicating multiple stages of reliability degree is displayed, for example. For example, one to five stars are displayed depending on the reliability degree. More stars indicate a higher reliability degree.

Incidentally, the processings shown in FIG. 2 assume that the position information of the subject of contribution as the correct answer data is previously registered, but the position information may not be previously registered for some subjects of contribution. For example, when the subject of contribution is a causeless event such as incident or accident, where the event happened cannot be previously known.

Therefore, when the position information of the subject of contribution is not registered in the position information DB 12*c*, the contribution information management server 1 causes the user to input the position information of the subject of contribution and determines the position information of the subject of contribution as the correct answer data based on the input position information (an example of the input position information). Specifically, the contribution information management server 1 registers the input position information as temporarily-registered position information of the subject of contribution in the position information DB 12*c*. Then, when a predetermined number of pieces of temporarily-registered position information are registered, the contribution information management server 1 determines the correct answer data based on multiple pieces of temporarily-registered position information. Since the user-input position information may not be correct or the user may input false position information, the contribution information management server 1 totally judges the position information input by multiple users thereby to specify the reliable position of the subject of contribution. Incidentally, when determining that the user having input the position information is reliable, the contribution information management server 1 may assume the input position information as the correct answer data.

After the position information as the correct answer data is determined, the contribution information management server 1 uses the position information to determine the reliability degree of the contribution data. The determination of the reliability degree of the contribution data previously registered in the contribution information DB 12*b* is held until the position information of the subject of contribution is determined, Thereby, causeless events can be addressed. For example, construction of a new building or movement of a shop can be addressed.

[2. Structure of Contribution Information Management Server]

A structure of the contribution information management server 1 will be described below with reference to FIGS. 5 and 6.

Figure 5:
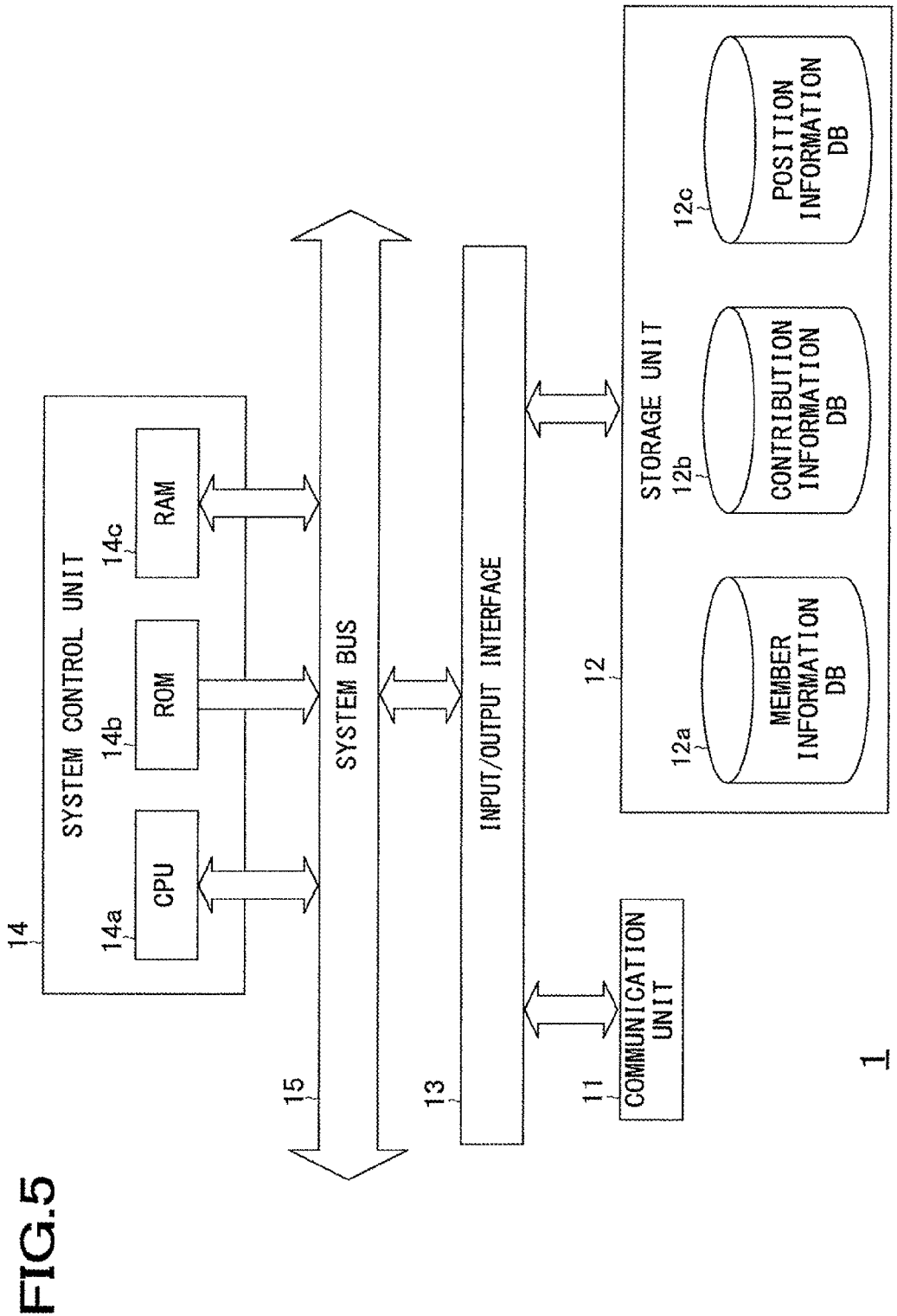
FIG. 5 is a block diagram showing an example of the schematic structure of a contribution information management server 1 according to one embodiment.

FIG. 5 is a block diagram showing an example of the schematic structure of the contribution information management server 1 according to the present embodiment. FIG. 6(*a*) is a diagram showing an example of contents registered in a member information DB 12*a*. FIG. 6(*b*) is a diagram showing an example of contents registered in the contribution information DB 12*b*. FIGS. 6(*c*) and 6(*d*) are diagrams showing examples of contents registered in the position information DB 12*c*.

As shown in FIG. 5, the contribution information management server 1 includes a communication unit 11, a storage unit 12, an input/output interface 13 and a system control unit 14. The system control unit 14 and the input/output interface 13 are connected with each other via a system bus 15.

The communication unit 11 is connected to the network NW to control a communication state with the user terminal 2 or the like.

The storage unit 12 (an example of the storage means and the contribution information storage means) is configured of a hard disc drive and the like, for example. In the storage unit 12, the member information DB 12*a*, the contribution information DB 12*b*, and the position information DB 12*c* are constructed.

In the member information DB 12*a*, information on the users registered in the contribution site S is registered. Specifically, in the member information DB 12*a*, as shown in FIG. 6(*a*), user ID as user identification information, password, name, date of birth, sex, address, phone number and e-mail address are registered in an associated manner per user.

In the contribution information DB 12*b*, user-contributed contribution information is registered. Specifically, in the contribution information DB 12*b*, as shown in FIG. 6(*b*), a serial number given in the contribution order to contribution data as contribution information, a date and time of contribution, a user ID of a user who contributes, contribution data, a reliability degree of the contribution data, a contribution subject word as a keyword indicating a subject of contribution (an example of the specific information), position information of the user terminal 2 indicating a contribution position, and a posting flag are registered in an associated manner per one contribution.

The posting flag indicates a state of the posting of the contribution data. The posting of the contribution data is held until the reliability degree is determined. When the position information of the subject of contribution as the correct answer data is not determined and the determination of the reliability degree is held, the posting flag is set at "held", and when the reliability degree is determined, the posting flag is set at "permitted." Incidentally, when the posting is prohibited, the contribution data is deleted from the contribution information DB 12*b*.

In the position information DB 12*c*, as shown in FIG. 6(*c*), position information of things, and temporarily-registered position information are registered. Specifically, in the position information DB 12*c*, a thing word indicating a thing, position information of the thing, and a state flag in an associated manner.

The state flag indicates whether the registered position information is correct answer data of the thing. When the registered position information is correct answer data of the thing, the state flag is set at "officially registered", and when the registered position information is not correct answer data of the thing, the state flag is set at "temporarily registered." The position information for which the state flag is set at "officially registered" is the correct answer data previously registered by the manager of the contribution site, or the position information determined as the correct answer data among the user-input position information. The position information for which the state flag is set at "temporarily registered" is the temporarily-registered position information.

When the state flag is set at "temporarily registered", in the position information DB 12*c*, the serial number given to the contribution data is registered in association with the temporarily-registered position information. When the correct answer data of the subject of contribution is not determined, the user-input contribution data is registered in the contribution information DB 12*b* but the determination of the reliability degree is held. Regarding this contribution data, the reliability degree needs to be determined later. Therefore, the user-input position information of the subject of contribution as the temporarily-registered position information is associated with the user-input contribution data by a serial number so that the contribution data for which the determination of the reliability degree is held can be specified.

In addition, in the position information DB 12*c*, information for specifying the position of the user terminal 2 based on the global IP address of the user terminal 2 is registered. Specifically, the position information DB 12*c* registers therein the IP address and the position information indicating a position corresponding to the IP address in an associated manner per IP address as shown in FIG. 6(*d*).

The forms of the position information of the user terminal 2, the position information of the thing, and the position information corresponding to the IP address may employ longitude and latitude, a text indicating an address, a local government code indicating a district, and identification information indicating a cell covered by a wireless base station, for example. However, the forms of the position information registered in each database are basically unified. For example, in order to unify the forms of the position information by address, when the position information of the user terminal 2 transmitted from the user terminal 2 indicates the longitude and the latitude, the longitude and the latitude are converted into the address to be registered.

When the address is used for the position information, the address registered as the position information may not be perfect. For example, an address may specify only a municipality or an address may specify only a street number.

In the storage unit 12, various pieces of data such as HTML (Hyper Text Markup Language) documents configuring Web pages, XML (Extensible Markup Language) documents, style sheets such as CSS (Cascading Style Sheets), image data, text data and electronic documents are stored.

Furthermore, in the storage unit 12, an operating system and a WWW (World Wide Web) server program are stored. In addition, in the storage unit 12, a contribution information management program (an example of the contribution information processing program) is stored. The contribution information management program is directed for, when the contribution information management server 1 receives contribution information from the user terminal 2, determining a reliability degree of the contribution information and determining a display form of the contribution information based on the reliability degree. The contribution information management program may be acquired from other server device via the network NW or may be recorded in a recording medium such as DVD (Digital Versatile Disc) and read via a drive device.

The input/output interface 13 performs an interface processing between the communication unit 11 as well as the storage unit 12 and the system control system 14.

The system control unit 14 is configured of a CPU (Central Processing Unit) 14*a*, a ROM (Read Only Memory) 14*b*, a RAM (Random Access Memory) 14*c*, and the like. The CPU 14*a* reads and executes the contribution information management program so that the system control unit 14 functions as a contribution information acquisition means, a terminal information acquisition means, an extraction means, a contribution subject information acquisition means, a comparison means, a determination means, a judgment means, an input information acquisition means, a position information storage control means, a contribution subject position information comparison means, a contribution subject position information determination means, a word extraction means, an identification information acquisition means, a contribution information storage control means, a range determination means, and a frequency information acquisition means according to the present invention.

The contribution information management server may be configured of multiple server devices. For example, a server device for receiving contribution information and determining its reliability degree, a server device for determining a display form corresponding to the determined reliability degree and transmitting a Web page on which the contribution information is posted in the determined display form in response to a request from the user terminal 2, and a server device for managing the databases such as the member information DB 12*a*, the contribution information DB 12*b* and the position information DB 12*c* may be connected with each other via a LAN (Local Area Network) or the like.

[3. Operations of Contribution System]

The operations of the contribution system S will be described below with reference to FIGS. 7 to 11.

FIGS. 7 and 8 are flowcharts showing a processing example in a contribution data reception process by the system control unit 14 in the contribution information management server 1 according to the present embodiment.

The user operates the user terminal 2 to contribute to a contribution site. Thereupon, a request is transmitted from the user terminal 2 to the contribution information management server 1, and in response thereto, the contribution information management server 1 transmits a Web page for contribution. The user inputs contribution data on the Web page for contribution displayed on the screen of the user terminal 2. Thereupon, the user terminal 2 transmits the input contribution data to the contribution information management server 1.

The contribution data reception process is started when the system control unit 14 as the contribution information acquisition means receives the contribution data from the user terminal 2.

As shown in FIG. 7, the system control unit 14 as the identification information acquisition means acquires the user ID of the user of the user terminal 2 having transmitted the contribution data (step S51). For example, the system control unit 14 receives the user ID and the pass word, which are input by the user for logging in the contribution site, from the user terminal 2, and performs user authentication by collating the information with the information registered in the member information DB 12a. When the authentication is successfully conducted, the system control unit 14 keeps the received user ID in the RAM 14c in association with session information. Then, the system control unit 14 receives the session information transmitted together with the contribution data by the user terminal 2, and acquires the user ID corresponding to the received session information. Incidentally, the system control unit 14 may acquire the identification information of the user terminal 2 instead of the user ID, as information for specifying the user, from the user terminal 2. The identification information of the user terminal 2 may be IMSI (International Mobile Subscriber Identity) stored in a SIM (Subscriber Identity Module) card, for example, if the user terminal 2 is a cell phone.

Next, the system control unit 14 as the contribution information storage control means registers the information such as the contribution data and the user ID (step S52). Specifically, the system control unit 14 generates a new serial number and acquires a current date and time as a date and time of contribution. Then, the system control unit 14 registers the serial number, the date and time of contribution, the user ID, the contribution data, and the posting flag set at "held" in an associated manner in the contribution information DB 12b.

The system control unit 14 as the extraction means specifies a subject of contribution from the contribution data (step S53). Specifically, the system control unit 14 performs morphological analysis or the like on the contribution data, and thereby extracts a contribution subject word. The technique for extracting a keyword based on the morphological analysis or the like is well known, and thus a detailed explanation of the processing of extracting a keyword will be omitted. The system control unit 14 registers the extracted contribution subject word in the contribution information DB 12b in association with the generated serial number.

Next, the system control unit 14 as the judgment means determines whether the position information as the correct answer data of the specified subject of contribution is registered in the position information DB 12c (step S54). Specifically, the system control unit 14 retrieves a thing word matching with the extracted contribution subject word from the thing words registered in the position information DB 12c. When a thing word matching with the extracted contribution subject word is found, the system control unit 14 acquires the state flag of the position information corresponding to the thing word from the position information DB 12c. Then, the system control unit 14 determines whether the acquired state flag is set at "officially registered."

At this time, when the acquired state flag is set at "officially registered", the system control unit 14 determines that the position information of the specified subject of contribution is registered (step S54: YES). In this case, the system control unit 14 as the contribution subject information acquisition means acquires the position information of the specified subject of contribution from the position information DB 12c (step S55).

Next, the system control unit 14 performs a terminal information acquisition process described later (step S56). In the terminal information acquisition process, the position information of the user terminal 2 having transmitted the contribution data is acquired.

Next, the system control unit 14 performs a reliability degree determination process described later (step S57). At this time, the system control unit 14 sets the serial number generated during the registration of the contribution data, and the position information of the subject of contribution acquired from the position information DB 12c as arguments. In the reliability degree determination process, the reliability degree of the contribution data is determined based on the position information of the user terminal corresponding to the serial number set as argument, and the position information of the subject of contribution set as argument. When terminating the processing in step S57, the system control unit 14 terminates the contribution data reception process.

In step S54, when a thing word matching with the extracted contribution subject word is not found or when the state flag acquired from the position information DB 12c is set at "temporarily registered", the system control unit 14 determines that the position information of the specified subject of contribution is not registered (step S54: NO). In this case, the system control unit 14 performs a terminal information acquisition process as shown in FIG. 8 (step S58).

Next, the system control unit 14 transmits a Web page for inputting the position information of the subject of contribution to the user terminal 2 (step S59). The user inputs an address indicating the position of the subject of contribution, for example, as the position information in the Web page for inputting position information displayed on the screen of the user terminal 2. Thereupon, the user terminal 2 transmits the input position information to the contribution information management server 1.

When the system control unit 14 as the input information acquisition means receives the user-input position information (step S60), the system control unit 14 registers the received position information as temporarily-registered position information in the position information DB 12c (step S61). Specifically, the system control unit 14 as the position information storage control means registers the extracted contribution subject word (thing word), the user-input position information, the state flag set at "temporarily registered", and the serial number generated during the registration of the contribution data in an associated manner in the position information DB 12c.

The system control unit 14 determines whether the user having input the position information is reliable (step S62). For example, when the reliability degree of the contribution data past-contributed by the user having input the position information is high, the system control unit 14 may determine that the user is reliable. Specifically, the system control unit 14 retrieves the contribution data, corresponding to the acquired user ID, from among the contribution data registered in the contribution information DB 12b. Next, the system control unit 14 acquires the reliability degree of each piece of retrieved contribution data from the contribution information DB 12b. Next, the system control unit 14 calculates an average value of the acquired reliabilities. Then, the system control unit 14 determines whether the average value of the reliabilities is a preset threshold or more.

At this time, when the average value of the reliabilities is the threshold or more, the system control unit 14 determines that the user having input the position information is reliable (step S62: YES). In this case, the system control unit 14 determines the registered temporarily-registered position information as the position information for the correct answer data of the subject of contribution (step S63). When the posting of the past contributions by the user having input the position information have been permitted many times, the system control unit 14 may determine that the user is reliable. Specifically, the system control unit 14 retrieves the contribution data corresponding to the acquired user ID from among the contribution data registered in the contribution information DB 12b. Next the system control unit 14 acquires the posting flag corresponding to each piece of retrieved contribution data from the contribution information DB 12b. Next, the system control unit 14 calculates the number of posting flags set at "permitted" among the acquired posting flags as the number of posting permissions. Then, the system control unit 14 determines whether the number of posting permissions is a preset threshold or more. When the number of posting permissions is the threshold or more, the system control unit 14 determines that the user having input the position information is reliable.

On the other hand, when the average value of the reliabilities is less than the threshold, the system control unit 14 determines that the user having input the position information is not reliable (step S62: NO). In this case, the system control unit 14 as the judgment means determines whether equal to or more than a predetermined number of pieces of temporarily-registered position information are registered (step S64). Specifically, the system control unit 14 retrieves the position information of which the thing word matches with the extracted contribution subject word from the position information DB 12c. The system control unit 14 calculates the number of pieces of retrieved position information. All the pieces of position information retrieved at this time are temporarily-registered position information (the state flags are set at "temporarily registered").

At this time, when determining that equal to or more than a predetermined number of pieces of temporarily-registered position information are not registered (step S64: NO), the system control unit 14 does not determine the position information of the subject of contribution and does not determine the reliability degree of the contribution data. Thus, the system control unit 14 terminates the contribution data reception process.

On the other hand, when determining that equal to or more than a predetermined number of pieces of temporarily-registered position information are registered (step S64: YES), the system control unit 14 as the contribution subject position information comparison means acquires each piece of retrieved temporarily-registered position information from the position information DB 12c, and compares the pieces of acquired temporarily-registered position information (step S65).

Next, the system control unit 14 as the contribution subject position information determination means determines the position information as the correct answer data of the subject of contribution based on the comparison result of the pieces of temporarily-registered position information (step S66). Specifically, the system control unit 14 specifies where the positions indicated by the respective pieces of temporarily-registered position information concentrate. The system control unit 14 determines a place where the positions indicated by the temporarily-registered position information concentrate as the position information of the subject of contribution.

For example, it is assumed that the pieces of temporarily-registered position information include one "Nishi-Shinjuku, Shinjuku-ku, Tokyo", three "3-chome, Nishi-Shinjuku, Shinjuku-ku, Tokyo", one "4-chome, Nishi-Shinjuku, Shinjuku-ku, Tokyo", one "5-chome, Nishi-Shinjuku, Shinjuku-ku, Tokyo", one "6-chome, Nishi-Shinjuku, Shinjuku-ku, Tokyo", one "Shinjuku, Shinjuku-ku, Tokyo", one "Yoyogi, Shibuya-ku, Tokyo" and one "Ginza, Chuo-ku, Tokyo". In this case, "3-chome, Nishi-Shinjuku, Shinjuku-ku, Tokyo" is the most, and thus the "3-chome, Nishi-Shinjuku, Shinjuku-ku, Tokyo" may be the position information of the subject of contribution. The addresses including "Nishi-Shinjuku, Shinjuku-ku, Tokyo" is the most, and thus "Nishi-Shinjuku, Shinjuku-ku, Tokyo" may be the position information of the subject of contribution.

For example, the addresses concentrate within Nishi-Shinjuku, Shinjuku-ku, Tokyo, and the center address may be the position information of the subject of contribution. For example, the system control unit 14 converts each address into the longitude and the latitude, and calculates a distance between the addresses. Then, the system control unit 14 calculates an average value of distances between each address and other addresses. Here, the system control unit 14 excludes the addresses for which the calculated average value of the distances exceeds a predetermined value, such as the address too distant from other addresses such as "Ginza, Chuo-ku, Tokyo" from the candidates of the position information of the subject of contribution, and recalculates the average value of the distances of the remaining addresses. Then, the system control unit 14 determines the address having the smallest calculated average value of the distances as the position information of the subject of contribution. That is, an address averagely close from any addresses is determined as the position information of the subject of contribution. In this case, for example, "4-chome, Nishi-Shinjuku, Shinjuku-ku, Tokyo" or the like is determined as the position information of the subject of contribution.

When determining the position information of the subject of contribution, the system control unit 14 sets the state flag of the temporarily-registered position information determined as the position information of the subject of contribution at "officially registered."

When terminating the processing in step S63 or S66, the system control unit 14 acquires the serial number corresponding to the position information determined as the position information of the subject of contribution from the position information DB 12c (step S67).

Next, the system control unit 14 performs a reliability degree determination process (step S68). At this time, the system control unit 14 sets the acquired serial number and the position information determined as the position information of the subject of contribution in arguments. In the reliability degree determination process in this case, there is determined the reliability degree of the contribution data input by the user having input the position information determined as the position information of the subject of contribution.

The system control unit 14 determines whether the temporarily-registered position information corresponding to the specified subject of contribution is still registered in the position information DB 12*c* except for the position information determined as the position information of the subject of contribution (step S69).

At this time, when determining that the temporarily-registered position information corresponding to the specified subject of contribution is still registered (step S69: YES), the system control unit 14 specifies one piece of temporarily-registered position information (step S70).

The system control unit 14 acquires the serial number corresponding to the specified temporarily-registered position information from the position information DB 12*c* (step S71).

The system control unit 14 performs the reliability degree determination process (step S72). At this time, the system control unit 14 sets the acquired serial number and the position information determined as the position information of the subject of contribution as arguments. In the reliability degree determination process in this case, there is determined the reliability degree of the contribution data input by the user having input the specified temporarily-registered position information.

Next, the system control unit 14 deletes the specified temporarily-registered position information from the position information DB 12*c* (step S73), and then proceeds to step S69.

The system control unit 14 repeats the processings in steps S69 to S73, and thereby determines the reliability degree of the contribution data for which the determination of the reliability degree is held in regard to the specified subject of contribution is held. Then, when determining that no temporarily-registered position information corresponding to the specified subject of contribution is registered (step S69: NO), the system control unit 14 terminates the contribution data reception process.

FIG. 9 is a flowchart showing a processing example in a terminal information acquisition process by the system control unit 14 in the contribution information management server 1 according to the present embodiment.

As shown in FIG. 9, the system control unit 14 transmits a position information transmission request to the user terminal 2 having transmitted the contribution data (step S101).

The user terminal 2 having received the position information transmission request uses, for example, a GPS to measure a current position or receives identification information of a cell corresponding to the current position from a wireless base station, and thereby acquires the position information of the user terminal 2. The user terminal 2 transmits the acquired position information as response information to the contribution information management server 1. On the other hand, when not being able to acquire the position information of the user terminal 2 itself, the user terminal 2 transmits the response information indicating that it was not able to acquire the position information to the contribution information management server 1.

When the system control unit 14 as the terminal information acquisition means receives the response information (step S102), the system control unit 14 determines whether it was able to receive the position information of the user terminal 2 (step S103). At this time, when the system control unit 14 determines that it was not able to receive the position information of the user terminal 2 (step S103: NO), it acquires the position information corresponding to the global IP address of the user terminal 2 from the position information DB 12*c* (step S104).

When the system control unit 14 determines that it was able to receive the position information of the user terminal 2 (step S103: YES) or when it terminates the processing in step S104, the system control unit 14 registers the received or acquired position information of the user terminal 2 (step S105). Specifically, the system control unit 14 registers the position information of the user terminal 2 in association with the serial number generated during the registration of the contribution data in the contribution information DB 12*b*. When terminating the processing in step S105, the system control unit 14 terminates the terminal information acquisition process.

FIG. 10 is a flowchart showing a processing example in a reliability degree determination process by the system control unit 14 in the contribution information management server 1 according to the present embodiment.

As shown in FIG. 10, the system control unit 14 acquires the user ID, the contribution data, and the position information of the user terminal 2 corresponding to the serial number set as argument from the contribution information DB 12*b* (step S151).

Next, the system control unit 14 as the comparison means compares the position information of the user terminal 2 acquired from the contribution information DB 12*b* with the position information of the subject of contribution set as argument. Then, the system control unit 14 calculates a difference between the two positions, that is, the position indicated by the position information of the user terminal 2 and the position indicated by the position information of the subject of contribution (step S152). Specifically, if the position information is of the longitude and the latitude, the system control unit 14 calculates a distance between the position of the user terminal 2 and the position of the subject of contribution as a difference between the two positions. if the position information indicates a district such as municipality, address or cell, the system control unit 14 calculates the number of areas (districts such as municipalities, districts indicated by address, or cells) routed up to where the user terminal 2 is positioned from where the subject of contribution is positioned as a difference between the two positions.

Next, the system control unit 14 determines the reliability degree of the contribution data based on the calculated difference between the two positions (step S153). At this time, as the difference between the two positions is smaller, the system control unit 14 further enhances the reliability degree.

Next, the system control unit 14 determines whether the determined reliability degree is equal to or more than the threshold stored in the storage unit 12 (step S154). At this time, when determining that the reliability degree is the threshold or more (step S154: YES), the system control unit 14 as the determination means determines to permit the posting of the contribution data (step S155).

Next, the system control unit 14 registers the determined reliability degree (step S156). Specifically, the system control unit 14 registers the determined reliability degree in association with the serial number set as argument in the contribution information DB 12b. The system control unit 14 sets the posting flag of the contribution data corresponding to the serial number set as argument at "permitted." When terminating the processing in step S156, the system control unit 14 terminates the reliability degree determination process.

In step S154, when determining that the reliability degree is less than the threshold (step S154: NO), the system control unit 14 as the range determination means determines a posting permitted range (an example of the position range in which contribution information is permitted to post) (step S157). The posting permitted range is a position range of the user terminal 2 in which contribution data is permitted to post around the position of the subject of contribution.

The format of the posting permitted range corresponds to the format of the position information. For example, if the position information is of the longitude and the latitude, the posting permitted range indicates a distance from the position of the subject of contribution to the farthest posting-permitted contribution position. For example, it is assumed that the position information is a local government code indicating a district such as municipality, text data indicating an address, or cell identification information. In this case, the posting permitted range indicates the number of areas (for example, districts such as municipalities, districts indicated by address, or cells) routed up to the farthest posting-permitted area from where the subject of contribution is positioned. If the posting is permitted only when a contribution is sent from where the subject of contribution is positioned, the posting permitted range indicates 0, and if the posting is permitted when a contribution is sent within a range up to an area adjacent to the area where the subject of contribution is positioned, the posting permitted range indicates 1.

The default posting permitted range is preset. The system control unit 14 enlarges or reduces the posting permitted range under a predetermined condition, and thereby determines a final posting permitted range. The enlargement of the posting permitted range means that the distance indicated by the posting permitted range is elongated or the value of the number of areas indicated by the posting permitted range is increased. The reduction in the posting permitted range means that the distance indicated by the posting permitted range is shortened or the value of the number of areas indicated by the posting permitted range is lowered.

Next, examples of the determination of the posting permitted range will be described below.

For example, the system control unit 14 extracts a negative keyword and a positive keyword from the contribution data, narrows the posting permitted range with more negative keywords, and enlarges the posting permitted range with more positive keywords. When the contribution content indicated by the contribution data is negative for the subject of contribution, a user viewing the contribution content may have a negative impression for the subject of contribution. Thus, it is preferable that a contributed negative content is not thoughtlessly posted. Therefore, as a negative degree of the contributed content is higher (with more negative keywords), the reliability of the contribution content is strongly required. That is, as the negative degree of the contributed content is higher, the posting permitted range is determined as where the user is highly likely to have directly experienced the subject of contribution, or is determined as where the user can more closely experience the subject of contribution.

The negative keywords include "bad", "not good", "poor", "dirty" and the like, for example. The positive keywords include "good", "tasty", "clean" and the like, for example. For example, the negative keywords and the positive keywords are previously registered in the database in a discriminable manner so that the system control unit 14 can extract a negative keyword and a positive keyword from the contribution data with reference to the database. Either a negative keyword or a positive keyword may be extracted.

For example, the system control unit 14 may determine the posting permitted range based on the user reliability degree. For example, in the same way as in the determination processing in step S62 in the contribution data reception process shown in FIG. 8, the average value of the reliabilities of the contribution data contributed in the past is calculated as the user reliability degree, and the posting permitted range may be enlarged as the average value of the user reliabilities is higher. As the number of posting permissions (an example of frequency information) is higher, the posting permitted range may be enlarged.

The user reliability degree may be calculated only for the reliability degree of the past contribution data of the currently-specified subject of contribution. The number of posting permissions may be limited to only the number of posting permissions of the contribution data of the currently-specified subject of contribution. Since the positions and the users' opinions may be different for subject of contribution, the posting permitted range is set for each subject of contribution and thus a determination can be made more flexibly.

The user reliability degree may be calculated only for the reliability degree of the contribution data contributed within a predetermined time backward from the current time. For example, the user may contribute for a subject of contribution and then successively contribute for the subject of contribution. In this case, the reliability degree of the contribution data contributed later is influenced by the reliability degree of the previously-contributed contribution data. However, it is considered that as a time passes from the previous contribution, a correlation between the reliability degree of the previously-contributed contribution data and the reliability degree of the currently-contributed contribution data is weakened. Thus, there is limited the contribution time for which the user reliability degree influencing the reliability degree of the currently-contributed contribution data is calculated. The contribution time for which the user reliability degree is calculated may be set based on the last contribution hour.

The number of posting permissions may be limited to only the number of posting permissions within a predetermined time backward from the current time. For example, the user may contribute for a subject of contribution and then successively contribute for the subject of contribution. In this case, it is assumed that as a time passes from the first contribution, the user can be farther from the position of the subject of contribution. Thus, the user is out of the initial posting permitted range. However, since the user of which the contribution has been permitted to post is considered as relatively reliable, posting may be permitted in such a case. Therefore, as the number of posting permissions is larger, the posting permitted range is enlarged. However, since it is assumed that as a long time passes, the reliability of the contribution content lowers, the contribution time for which the number of posting permissions is calculated is limited.

The contribution time for which the number of posting permissions is calculated may be set based on the last contribution hour.

The system control unit 14 may use the same method as step S65 in the contribution data reception process shown in FIG. 8. Specifically, the system control unit 14 retrieves the contribution data of which the posting flag is set at "permitted" among the past contribution data of all the users for the currently-specified subject of contribution from the contribution information DB 12b, and acquires the position information of the user terminal 2 corresponding to the retrieved contribution data from the contribution information DB 12b. Next, the system control unit 14 calculates a distance between the positions indicated by the respective pieces of position information based on the position information corresponding to the acquired past contribution data and the position information acquired in step S151. The system control unit 14 calculates an average value of the distances from each position to other positions. Here, as the average distance calculated for the position information acquired in step S151 is longer than the average distance calculated for each piece of position information corresponding to the past contribution data, the system control unit 14 narrows the posting permitted range. That is, as the current contribution position is farther from each contribution position where the contribution was sent for the same subject of contribution, the system control unit 14 lowers the reliability degree of the currently-contributed user.

When determining the posting permitted range, the system control unit 14 determines whether the comparison result by the position information of the user terminal 2 and the position information of the subject of contribution in step S152 is within the determined posting permitted range (step S158). Specifically, with the determination by distance, when the distance between the position of the user terminal 2 and the position of the subject of contribution is equal to or less than the distance indicated by the posting permitted range, the system control unit 14 determines that the comparison result is within the posting permitted range. With the determination by the number of areas, when the number of areas routed from where the subject of contribution is positioned up to where the user terminal 2 is positioned is equal to or less than the number of areas indicated by the posting permitted range, the system control unit 14 determines that the comparison result is within the posting permitted range.

When determining that the comparison result is within the posting permitted range (step S158: YES), the system control unit 14 as the determination means determines to permit the contribution data to be posted (step S155). On the other hand, when determining that the comparison result is not within the posting permitted range (step S158: NO), the system control unit 14 as the determination means determines to prohibit the contribution data from being posted (step S159). At this time, the system control unit 14 deletes the contribution data corresponding to the serial number set as argument from the contribution information DB 12b. When terminating the processing in step S159, the system control unit 14 terminates the reliability degree determination process.

Incidentally, the system control unit 14 may adjust the determined reliability degree in the same method as the determination of the posting permitted range after the reliability degree is determined in step S153 and before the processing in step S154 is performed. That is, the system control unit 14 may adjust the reliability degree based on a negative keyword or positive keyword extracted from the contribution data, may adjust the reliability degree based on the user reliability degree, or may adjust the reliability degree based on the position relationship with the past contribution position of the same subject of contribution, for example. In this case, the system control unit 14 enhances the reliability degree instead of enlarging the posting permitted range, and lowers the reliability degree instead of narrowing the posting permitted range. When enhancing the reliability degree, the system control unit 14 adds a positive value to the reliability degree or multiplies the reliability degree by a coefficient larger than 1 thereby to determine a final reliability degree. On the other hand, when lowering the reliability degree, the system control unit 14 subtracts a positive value from the reliability degree or multiplies the reliability degree by a coefficient smaller than 1 thereby to determine a final reliability degree.

Figure 11:
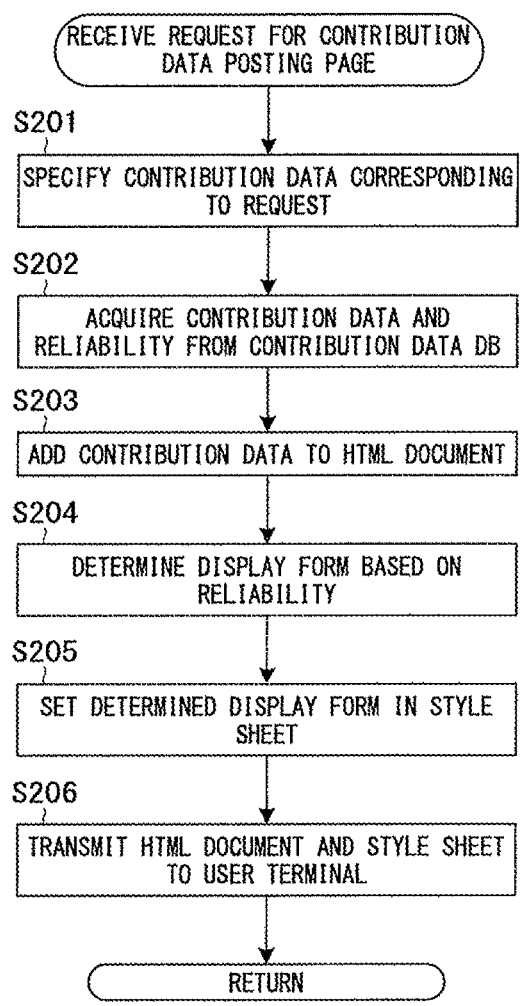
FIG. 11 is a flowchart showing a processing example in a contribution information posting page request reception process by the system control unit 14 in the contribution information management server 1 according to one embodiment.

FIG. 11 is a flowchart showing a processing example in a contribution information posting page request reception process by the system control unit 14 in the contribution information management server 1 according to the present embodiment.

The user operates the user terminal 2 to browse contribution information posting pages. Thereupon, the user terminal 2 transmits a request for contribution information posting page to the contribution information management server 1. The contribution information posting page request reception process is started when the system control unit 14 receives the request for contribution information posting page from the user terminal 2.

At first, the system control unit 14 specifies contribution data to be posted on the contribution information posting page corresponding to the received request (step S201). At this time, the system control unit 14 specifies the contribution data to be posted among the contribution data of which the posting flags are set at "permitted." The contribution data specification method is different depending on the request content or the specific content of the contribution site, for example. Thus, a detailed explanation of the contribution data specification method will be omitted.

Next, the system control unit 14 acquires the specified contribution data and other information to be posted on the contribution information posting page from the contribution information DB 12b, and acquires the reliability degree corresponding to the specified contribution data from the contribution information DB 12b (step S202).

The system control unit 14 acquires the HTML documents for the contribution information posting page from the storage unit 12, and adds the contribution data acquired from the contribution information DB 12b to the acquired HTML documents (step S203).

The system control unit 14 as the determination means determines the display form according to the reliability degree acquired from the contribution information DB 12b (step S204). Specifically, the system control unit 14 determines a value of color or a value of font-size set for style sheet, for example. At this time, the system control unit 14 may calculate a value indicating the display form from the reliability degree based on the predetermined equations or may determine the display form based on a table indicating a correspondence between the reliability degree and the display form.

The system control unit 14 acquires the style sheet for the contribution information posting page from the storage unit 12, and sets the determined display form in the acquired style sheet (step S205).

When specifying a plurality of pieces of contribution data to be posted, the system control unit 14 determines the display form and sets it in the style sheet per a piece of contribution data.

The system control unit 14 transmits the HTML document and style sheet for the contribution information posting page to the user terminal 2 (step S206), and terminates the contribution information posting page request reception process. The system control unit 14 may transmit the HTML document including the style sheet to the user terminal 2 instead of assuming the style sheet as independent data.

The user terminal 2 displays the contribution information posting page based on the received HTML document and style sheet on the screen as shown in FIG. 3 or 4, for example.

As described above, according to the present embodiment, the system control unit 14 acquires contribution data from the user terminal 2, acquires position information of the user terminal 2, extracts a contribution subject word from the acquired contribution data, acquires position information of a subject of contribution specified by the extracted contribution subject word, compares the acquired position information of the subject of contribution with the acquired position information of the user terminal 2, and determines a display form of the acquired contribution data based on a reliability degree of the contribution data calculated based on the comparison result. Thus, the display form for posting the contribution data can be determined depending on whether the user can directly experience the subject of contribution based on the position relationship between the subject of contribution and the user terminal 2. Accordingly, the viewer can recognize the reliability of the contribution data based on the display form of the contribution data.

In addition, the system control unit 14 determines whether to permit or prohibit the posting of the acquired contribution data based on the comparison result of the position information. Thus, a judgment is made as to whether the user can directly experience the subject of contribution based on the position relationship between the subject of contribution and the user terminal 2, and thereby it is possible to determine whether to permit or prohibit the posting. Accordingly, it is possible to prevent the posting of the contribution data having with low reliability that the user has contributed the contribution data without directly experiencing the subject of contribution.

Furthermore, the system control unit 14 determines whether the position information of the subject of contribution corresponding to the extracted contribution subject word is registered in the position information DB 12c, acquires the user-input position information from the user terminal 2 when it is determined that the position information of the subject of contribution corresponding to the extracted contribution subject word is not registered, registers the acquired position information as the temporarily-registered position information in the position information DB 12c in association with the extracted contribution subject word, and acquires the temporarily-registered position information determined as the position information of the subject of contribution as the position information of the subject of contribution used for determining the display form of the contribution data. Thus, even when an event which cannot be previously known when and where to happen, such as incident or accident, is determined as a subject of contribution and the contribution is performed, the display form of the contribution data can be determined.

Moreover, The system control unit 14 determines whether equal to or more than a predetermined number of pieces of temporarily-registered position information corresponding to the extracted contribution subject word are registered in the position information DB 12c, acquires the user-input position information when it is determined that equal to or more than a predetermined number of pieces of temporarily-registered position information corresponding to the extracted contribution subject word are not registered, compares the pieces of temporarily-registered position information when it is determined that equal to or more than a predetermined number of pieces of temporarily-registered position information corresponding to the extracted contribution subject word are registered, and determines the position information of the specified subject of contribution based on the comparison result. Thus, multiple pieces of user-input position information are used to determine the position information of the subject of contribution, and thereby it is possible to enhance the reliability of the position information of the subject of contribution.

In Addition, The system control unit 14 extracts at least one of a negative keyword and a positive keyword from the contribution data, calculates the reliability degree of the contribution data based on the extraction result and the comparison result of the position information, and determines the display form of the acquired contribution data based on the reliability degree. Thus, in consideration of an effect on the subject of contribution when the contribution data is posted, the display form of the contribution data can be determined.

Moreover, the system control unit 14 extracts at least one of a negative keyword and a positive keyword from the contribution data, determines the posting permitted range based on the extraction result, and determines to permit the posting when the position indicated by the acquired position information of the user terminal 2 is included in the posting permitted range from the position indicated by the acquired position information of the subject of contribution. Thus, in consideration of an effect on the subject of contribution when the contribution data is posted, whether to permit the posting can be determined depending on how far from the subject of contribution the user has contributed.

In Addition, the system control unit 14 acquires the user ID for identifying the user of the user terminal 2, registers the acquired contribution data, the reliability degree of the contribution data and the user ID in the contribution information DB 12b in an associated manner, calculates the reliability degree of the contribution data based on the comparison result of the position information and the reliability degree of the past-registered contribution data associated with the acquired user ID, and determines the display form of the acquired contribution data based on the reliability degree. Thus, the reliability degree of the contribution data past-contributed by the user may be reflected on the display form of the contribution data.

Moreover, the system control unit 14 acquires the user ID for identifying the user of the user terminal 2, registers the acquired contribution data in the contribution information DB 12b in association with the user ID, calculates the number of posting permissions of the contribution data corresponding to the acquired user ID, and determines the posting permitted range such that the posting permitted range is enlarged as the number of posting permissions is larger. Thus, it is possible to post the contribution data from the user who is considered as highly reliable based on the past records.

Incidentally, when extracting a contribution subject word from the contribution data, the system control unit 14 may extract multiple contribution subject words thereby to specify multiple subjects of contribution. In this case, the system control unit 14 acquires the position information of the subject of contribution from the position information DB 12c per specified subject of contribution, and compares the pieces of acquired position information of the subjects of contribution with the position information of the user terminal 2, respectively. Then, the system control unit 14 may determine the reliability degree of the contribution data based on the comparison result between the position information of the subject of contribution closest to the position of the user terminal 2 among the multiple specified subjects of contribution, and the position information of the user terminal 2. Thereby, even when the user contributes for multiple things as subjects of contribution, the reliability degree can be properly determined.

The system control unit 14 may use a difference between the two positions instead of the reliability degree, that is, the position indicated by the position information of the user terminal 2 and the position indicated by the position information of the subject of contribution without calculating the reliability degree. In this case, the system control unit 14 registers the information indicating the difference between the two positions in the contribution information DB 12b instead of the reliability degree, and determines the display form of the contribution data based on the difference between the two positions. The system control unit 14 determines the display form indicating that the reliability of the contribution data is higher as the difference between the two positions is smaller, and determines the display form indicating that the reliability of the contribution data is lower as the difference between the two positions is larger. The system control unit 14 makes the adjustment for the reliability degree in the reliability degree determination process to the difference between the two positions.

The system control unit 14 may determine the display form of the contribution data when registering the contribution data received from the user terminal 2 in the contribution information DB 12b. In this case, the system control unit 14 registers the information indicating the determined display form in the contribution information DB 12b instead of the information on the reliability degree or the difference between the two positions.

When determining the display form of the contribution data on receiving the contribution data from the user terminal 2, the system control unit 14 may generate the HTML document and the style sheet for the contribution information posting page on which the contribution data is posted at the time of receiving. In this case, the system control unit 14 may transmit the previously generated HTML document and style sheet on receiving the request for contribution information posting page from the user terminal 2.

The contribution information may be applied to voice data, and thus the user can input the contribution content by his/her voice via the user terminal 2 including a microphone. In this case, the system control unit 14 receives the voice data generated by the voice input from the user terminal 2, and registers the voice data in the contribution information DB 12b. The system control unit 14 extracts user-spoken words as text data from the voice data by the voice recognition processing. Then, the system control unit 14 extracts a contribution subject word from the text data and specifies the subject of contribution. The system control unit 14 determines the output quality of the voice data as the contribution information, that is, the sound quality, as the display form of the contribution information on posting based on the determined reliability degree. Specifically, the system control unit 14 enhances the sound quality with a higher reliability degree, and lowers the sound quality with a lower reliability degree. The system control unit 14 converts the voice data as the contribution information depending on the determined sound quality. Specifically, when the reliability degree has a possible maximum value, the control system unit 14 does not convert the voice data and thereby does not change the sound quality. On the other hand, the system control unit 14 converts the voice data such that the sound quality is deteriorated as the reliability degree is lower. For example, the system control unit 14 changes a bit rate, a sampling frequency, a compression rate or the like of the voice data, and thereby deteriorates the sound quality. Alternatively, the system control unit 14 may deteriorate the sound quality by adding many noises to the voice as the reliability degree is lower. Then, the system control unit 14 generates the HTML document for a Web page such that the user browsing the contribution site can reproduce the voice data as the contribution information. The user can recognize the reliability of the voice data as the contribution information from the sound quality of the voice output from the user terminal 2 by reproducing the voice data.

The contribution information is applied to video data including voice data, and thus the user may input the contribution content by voice and images via the user terminal 2 including a microphone and a camera. The subject of contribution specification method in this case is the same as that for the voice data. The system control unit 14 determines the output quality of the video data as the contribution information, that is, the image quality, as the display form of the contribution information on posting based on the determined reliability degree. Specifically, the system control unit 14 enhances the image quality with a higher reliability degree, and lowers the image quality with a lower reliability degree. The system control unit 14 converts the video data as the contribution information depending on the determined image quality. Specifically, when the reliability degree has a possible maximum value, the system control unit 14 does not convert the video data and thereby does not change the image quality. On the other hand, the system control unit 14 converts the video data such that the image quality is deteriorated as the reliability degree is lower. For example, the system control unit 14 changes a bit rate, a frame rate, an image resolution, a compression rate or the like of the video data, and thereby deteriorates the image quality. Alternatively, the system control unit 14 may deteriorate the image quality by adding many noises to the frame image of the video data as the reliability degree is lower. The system control unit 14 generates the HTML document for a Web page such that the user browsing the contribution site can reproduce the video data as the contribution information. The user can recognize the reliability of the video data as the contribution information from the image quality of the video displayed on the screen of the user terminal 2 by reproducing the video data. The system control unit 14 may determine the sound quality of the voice data contained in the video data based on the reliability degree, and may convert the video data depending on the determined sound quality.

EXPLANATION OF REFERENCE NUMERALS

1: Contribution information management server
2: User terminal
11: Communication unit
12: Storage unit
12a: Member information DB
12b: Contribution information DB 12c: Position information DB
13: Input/output interface
14: System control unit
14a: CPU
14b: ROM
14c: RAM
15: System bus
NW: Network
S: Contribution system

The invention claimed is:

1. A server device to which a terminal device is connectable via a network, comprising:
   at least one memory operable to store program code;
   at least one processor operable to read said program code and operate as instructed by said program code, said program code including:
   contribution information acquisition code that causes the at least one processor to acquire contribution information from the terminal device;
   terminal information acquisition code that causes the at least one processor to acquire terminal position information indicating a position of the terminal device;
   extraction code that causes the at least one processor to extract specific information capable of specifying a subject of contribution from the acquired contribution information;
   contribution subject information acquisition code that causes the at least one processor to acquire contribution subject position information indicating a position of the subject of contribution specified by the extracted specific information;
   comparison code that causes the at least one processor to compare the acquired contribution subject position information with the acquired terminal position information;
   propriety information acquisition code that causes the at least one processor to acquire at least one of a negative word and a positive word from the acquired contribution information by referring to a database, in which pre-registered negative keywords and positive keywords are stored, and matching a word included in the acquired contribution information with the pre-registered negative keywords and positive keywords stored in the database, or acquire the frequency information indicating the number of permissions for posting contribution information;
   range determination code that causes the at least one processor to determine, based on the acquired word according to a result of the matching or the acquired frequency information, a position range, in which the contribution information is permitted to post; and
   posting determination code that causes the at least one processor to determine whether to permit or prohibit posting of the acquired contribution information based on the comparison result by the comparison code and the position range determined by the range determination code.

2. The server device according to claim 1, further comprising:
   judgment code that causes the at least one processor to determine whether the contribution subject position information corresponding to the extracted specific information is stored in a storage that stores the contribution subject position information in association with the specific information;
   input information acquisition code that causes the at least one processor to acquire input position information input by a user from the terminal device when it is determined that the contribution subject position information corresponding to the extracted specific information is not stored in the storage; and
   position information storage control code that causes the at least one processor to store the acquired input position information as the contribution subject position information in the storage in association with the extracted specific information,
   wherein the contribution subject information acquisition code causes the at least one processor to acquire the contribution subject position information stored in the storage as the contribution subject position information used for a comparison by the comparison code.

3. The server device according to claim 2, wherein the judgment code causes the at least one processor to determine whether equal to or more than a predetermined number of pieces of the contribution subject position information corresponding to the extracted specific information are stored in the storage, the server device further comprising:
   contribution subject position information comparison code that causes the at least one processor to, when it is determined that equal to or more than a predetermined number of pieces of the contribution subject position information corresponding to the extracted specific information are stored, compare the pieces of contribution subject position information; and
   contribution subject position information determination code that causes the at least one processor to determine the contribution subject position information used for a comparison by the comparison code based on a comparison result by the contribution subject position information comparison code,
   wherein the contribution subject information acquisition causes the at least one processor to acquire the contribution subject position information determined by the contribution subject position information determination code.

4. The server device according to claim 1, further comprising:
   display form determination code that causes the at least one processor to determine a display form of the acquired contribution information on posting based on a comparison result by the comparison code;
   identification information acquisition code that causes the at least one processor to acquire identification information for identifying a user of the terminal device; and
   contribution information storage control code that causes the at least one processor to store the acquired contribution information, result information indicating a comparison result by the comparison code, and the acquired identification information in a contribution information storage in an associated manner,
   wherein the display form determination code causes the at least one processor to determine the display form of the acquired contribution information on posting based on a comparison result by the comparison code and the result information stored in the past in association with the acquired identification information.

5. The server device according to claim 1, further comprising:
   display form determination code that causes the at least one processor to determine a display form of the acquired contribution information on posting based on a comparison result by the comparison code;
   wherein the contribution subject information acquisition code causes the at least one processor to acquire the contribution subject position information per one piece of the specific information when the plurality of pieces of specific information are extracted, the comparison code causes the at least one processor to compare the contribution subject position information acquired per one piece of the specific information with the acquired terminal position information, and the display form determination code causes the at least one processor to determine the display form of the acquired contribution information on posting based on a comparison result between the contribution subject position information indicating a position closest to the position indicated by the acquired terminal position information among the contribution subject position information acquired per one piece of the specific information, and the terminal position information.

6. The server device according to claim 1, further comprising:

identification information acquisition code that causes the at least one processor to acquire identification information for identifying a user of the terminal device; and contribution information storage control code that causes the at least one processor to store the acquired contribution information in a contribution information storage in association with the acquired identification information, wherein when a position indicated by the acquired terminal position information is included in the determined range from a position indicated by the acquired contribution subject position information, the posting determination code causes the at least one processor to determine to permit the posting.

7. The server device according to claim 1, wherein, when the position range is determined based on the acquired word, the position range is determined such that the position range is increased according to a number of the matching between the acquired contribution information and the pre-registered positive keywords stored in the database and the position range is decreased according to a number of the matching between the acquired contribution information and the pre-registered negative keywords stored in the database.

8. A contribution information processing method in a server device to which a terminal device is connectable via a network, the method comprising:

a contribution information acquisition step of acquiring contribution information from the terminal device;

a terminal information acquisition step of acquiring terminal position information indicating a position of the terminal device;

an extraction step of extracting specific information capable of specifying a subject of contribution from the acquired contribution information;

a contribution subject information acquisition step of acquiring contribution subject position information indicating a position of the subject of contribution specified by the extracted specific information;

a comparison step of comparing the acquired contribution subject position information with the acquired terminal position information;

a propriety information acquisition step of acquiring at least one of a negative word and a positive word from the acquired contribution information by referring to a database, in which pre-registered negative keywords and positive keywords are stored, and matching a word included in the acquired contribution information with the pre-registered negative keywords and positive keywords stored in the database, or acquiring the frequency information indicating the number of permissions for posting contribution information;

a range determination step of determining, based on the acquired word according to a result of the matching or the acquired frequency information, a position range, in which the contribution information is permitted to post; and a posting determination step of determining whether to permit or prohibit posting of the acquired contribution information based on the comparison result in the comparison step and the position range determined in the range determination step.

* * * * *